United States Patent
Yoon et al.

(10) Patent No.: US 10,908,805 B2
(45) Date of Patent: Feb. 2, 2021

(54) WEARABLE DEVICE AND EXECUTION OF APPLICATION IN WEARABLE DEVICE

(71) Applicant: SAMSUNG ELECTRONICS CO., LTD., Suwon-si (KR)

(72) Inventors: Jin Yoon, Seoul (KR); Young-joo Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 15/968,379

(22) Filed: May 1, 2018

(65) Prior Publication Data

US 2018/0253205 A1 Sep. 6, 2018

Related U.S. Application Data

(62) Division of application No. 14/875,902, filed on Oct. 6, 2015, now abandoned.

(30) Foreign Application Priority Data

Oct. 16, 2014 (KR) .................. 10-2014-0140168

(51) Int. Cl.
G06F 3/0485 (2013.01)
G06F 3/0482 (2013.01)
G06F 3/0488 (2013.01)
G06F 1/16 (2006.01)

(52) U.S. Cl.
CPC ............ *G06F 3/0485* (2013.01); *G06F 1/163* (2013.01); *G06F 3/0482* (2013.01); *G06F 3/0488* (2013.01)

(58) Field of Classification Search
CPC ................................................ G06F 3/0485
USPC ........................................................ 715/784
See application file for complete search history.

(56) References Cited

U.S. PATENT DOCUMENTS

| | | | |
|---|---|---|---|
| 8,954,878 B2 | 2/2015 | Petersen | |
| 9,285,975 B2 * | 3/2016 | Fukunaga | G09G 5/346 |
| 9,323,363 B2 | 4/2016 | Perala | |
| 9,513,665 B2 | 12/2016 | Magi | |
| 9,568,891 B2 | 2/2017 | Adams | |
| 9,652,135 B2 | 5/2017 | Seo | |
| 9,665,124 B2 | 5/2017 | Kim | |
| 10,222,974 B2 * | 3/2019 | Lamb | G06F 3/04883 |
| 2004/0133781 A1 * | 7/2004 | Guillou | H04L 9/3033 |
| | | | 713/170 |
| 2006/0062168 A1 | 3/2006 | Kang et al. | |

(Continued)

FOREIGN PATENT DOCUMENTS

| | | |
|---|---|---|
| KR | 10-0663456 | 12/2006 |
| KR | 10-2009-0046039 | 5/2009 |

OTHER PUBLICATIONS

Office Action dated Feb. 1, 2018 in U.S. Appl. No. 14/875,902.

(Continued)

*Primary Examiner* — William D Titcomb
(74) *Attorney, Agent, or Firm* — Nixon & Vanderhye, P.C.

(57) ABSTRACT

A method of executing an application in a wearable device and a wearable device are disclosed, the method including receiving an input requesting execution of a first application, acquiring time information required to execute the first application in response to the input, and scrolling and displaying a predetermined image in a first direction until the execution of the first application based on the time information.

17 Claims, 17 Drawing Sheets

(56) References Cited

U.S. PATENT DOCUMENTS

| | | | |
|---|---|---|---|
| 2011/0157046 A1 | 6/2011 | Lee et al. | |
| 2011/0209093 A1* | 8/2011 | Hinckley | G06F 3/04817 |
| | | | 715/834 |
| 2011/0212717 A1* | 9/2011 | Rhoads | G06K 9/00664 |
| | | | 455/420 |
| 2012/0015779 A1* | 1/2012 | Powch | A61B 5/02055 |
| | | | 482/9 |
| 2012/0086857 A1 | 4/2012 | Kim et al. | |
| 2012/0173975 A1* | 7/2012 | Herz | G06F 3/0482 |
| | | | 715/716 |
| 2012/0173982 A1* | 7/2012 | Herz | G06F 3/0482 |
| | | | 715/719 |
| 2012/0284673 A1* | 11/2012 | Lamb | G06F 3/04883 |
| | | | 715/863 |
| 2013/0055121 A1 | 2/2013 | Cho et al. | |
| 2013/0254705 A1 | 9/2013 | Mooring et al. | |
| 2013/0322846 A1* | 12/2013 | Ferren | G06F 3/0482 |
| | | | 386/234 |
| 2013/0337789 A1* | 12/2013 | Johnson | H04W 64/00 |
| | | | 455/414.1 |
| 2014/0068494 A1 | 3/2014 | Petersen | |
| 2014/0160078 A1 | 6/2014 | Seo | |
| 2014/0337861 A1* | 11/2014 | Chang | G06F 9/4843 |
| | | | 719/313 |
| 2014/0371887 A1* | 12/2014 | Hoffman | G06K 9/00342 |
| | | | 700/91 |
| 2014/0372356 A1* | 12/2014 | Bilal | G06F 9/445 |
| | | | 706/46 |
| 2015/0067819 A1* | 3/2015 | Shribman | H04L 67/06 |
| | | | 726/12 |
| 2015/0212664 A1* | 7/2015 | Freer | G06F 3/0482 |
| | | | 705/14.54 |
| 2015/0002434 A1 | 12/2015 | Tsukahara | |
| 2015/0348495 A1 | 12/2015 | Kim | |
| 2016/0094622 A1* | 3/2016 | Thomas | H04L 67/10 |
| | | | 709/203 |
| 2016/0170608 A1* | 6/2016 | Zambetti | G06F 1/163 |
| | | | 715/810 |
| 2016/0202866 A1 | 7/2016 | Zambetti | |
| 2016/0299570 A1* | 10/2016 | Davydov | G06F 3/167 |
| 2018/0183775 A1* | 6/2018 | Malkapuram | G06F 21/31 |

OTHER PUBLICATIONS

Notice of Non-final Rejection dated Sep. 29, 2020 in counterpart Korean Patent Application No. 10-2014-0140168 and English-language translation.

\* cited by examiner

| APPLICATION | TIME REQUIRED UNTIL EXECUTON (SECOND) |
|---|---|
| Today's Schedule | 1 |
| Camera | 2 |

WEARABLE DEVICE AND EXECUTION OF APPLICATION IN WEARABLE DEVICE

CROSS-REFERENCE TO RELATED APPLICATION

This application is a divisional of U.S. application Ser. No. 14/875,902, filed on Oct. 6, 2015, which is based on and claims priority under 35 U.S.C. § 119 to Korean Patent Application No. 10-2014-0140168, filed on Oct. 16, 2014, in the Korean Intellectual Property Office. The disclosure of each of these applications is incorporated by reference herein in its entirety.

BACKGROUND

1. Field

The disclosure relates, for example, to a method of executing an application in a wearable device and a wearable device for the same.

2. Description of Related Art

A wearable device is generally a device capable of performing a computing activity by being attached to the human body and also includes some applications capable of performing a computing function.

Wearable devices have been gradually evolving with respect to the fact that new services which cannot be provided by existing devices may be provided with a computer close to a user. The wearable devices started to be used in the military and industry fields in the early 1990s and have been commercialized in the forms of a watch, an accessory, and the like applicable to the everyday life through a combination with a smart device since 2000.

Since wearable devices have been mainly developed for the specific purposes such as military, medical treatment, and the like for a long time, convenient interfaces for general users have been insufficiently provided.

Therefore, a system capable of providing a convenient and intuitive user interface and an improved user experience in a wearable device needs to be introduced.

SUMMARY

According to an aspect of an example embodiment, a method of executing an application in a wearable device includes: receiving an input for requesting execution of a first application; acquiring time information required to execute the first application in response to the input; and scrolling and displaying a predetermined image in a first direction until the execution of the first application based on the time information.

The input for requesting execution of the first application may include a drag input in the first direction.

The method may further include: providing an application list including identification information of at least one application; selecting the first application from the application list based on an input (e.g., a drag input) in a second direction that is different from the first direction; and displaying identification information of the selected first application.

Providing the application list may include changing an arrangement order of the identification information of the at least one application included in the application list based on a user input.

The scrolling and displaying of the predetermined image in the first direction may include displaying an execution window of the first application next to the predetermined image based on the time information.

The method may further include: receiving an application switch input while displaying the execution window of the first application; selecting a second application adjacent in an order to the identification information of the first application and being executed from the application list based on the application switch input; and displaying an execution window of the second application.

Acquiring the time information may include acquiring the time information based on at least one of the performance of the wearable device, a load of the wearable device, and a load of the first application.

The scrolling and displaying of the predetermined image in the first direction may include adjusting a scroll speed in the first direction based on the time information if a length of the predetermined image is pre-defined.

The method may further include: receiving an input (e.g., a drag input) in a third direction that is different from the first direction while displaying the execution window of the first application; and displaying a previous image displayed before the execution of the first application based on the drag input in the third direction.

According to another example, a wearable device includes: a user interface configured to receive an input for requesting execution of a first application; a controller configured to acquire time information required to execute the first application in response to the input; and a display configured to scroll and display a predetermined image in a first direction until execution of the first application based on the time information.

The input for requesting execution of the first application may include a drag input in the first direction.

The controller may be configured to provide an application list including identification information of at least one application, the user interface may be configured to receive a drag input in a second direction that is different from the first direction to select the first application from the application list, and the display may be configured to display identification information of the selected first application.

The controller may be configured to change an arrangement order of the identification information of the at least one application included in the application list based on a user input.

The display may be configured to display an execution window of the first application next to the predetermined image based on the time information.

The user interface may be configured to receive an application switch input while displaying the execution window of the first application, the controller may be configured to select a second application adjacent in an order to the identification information of the first application and being executed from the application list based on the application switch input, and the display may be configured to display an execution window of the second application.

The controller may be configured to acquire the time information based on at least one of the performance of the wearable device, a load of the wearable device, and a load of the first application.

The controller may be configured to adjust a scroll speed in the first direction based on the time information if a length of the predetermined image is pre-defined.

The user interface may be configured to receive a drag input in a third direction that is different from the first direction while the display displays the execution window of the first application, and the display may be configured to display a previous image displayed before the execution of the first application based on the drag input in the third direction.

BRIEF DESCRIPTION OF THE DRAWINGS

These and/or other aspects will become apparent and more readily appreciated from the following detailed description, taken in conjunction with the accompanying drawings in which like reference numerals refer to like elements, and wherein.

DETAILED DESCRIPTION

Figure 1:
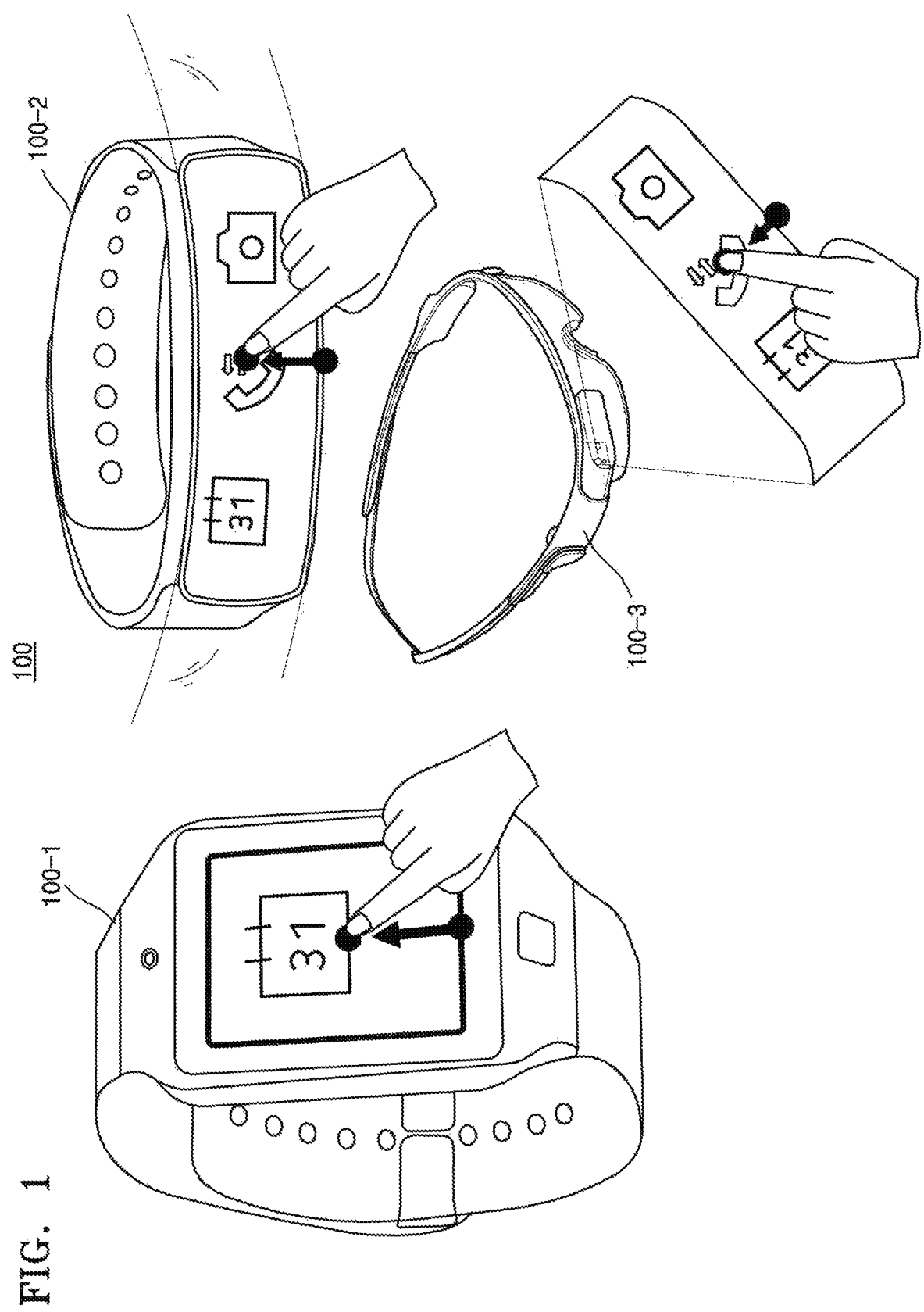
FIG. 1 illustrates an example execution operation of an application in a wearable device.

Although general current terms have been used to describe the examples based on the functions in the example embodiments, the terms may vary according to the intention of one of ordinary skill in the art, case precedents, and the appearance of new technology. In addition, in specific situations, terms selected by the applicant may be used, and in these situations, the meaning of these terms will be disclosed in corresponding descriptions of the specification. Accordingly, the terms used in the specification to describe the examples are defined not by their simple names but by their meanings in the context of the examples.

In the disclosure, when a certain part "includes" a certain component, this indicates that the part may further include another component instead of excluding the other component unless there is different disclosure. In addition, a term such as "unit" or "module" disclosed in the specification indicates a unit for processing at least one function or operation, which may be implemented by hardware, software, or a combination thereof.

In addition, in the disclosure, although terms, such as 'first' and 'second', may be used to describe various elements, the elements are not limited by the terms. The terms can be used to classify a certain element from another element. For example, a first element can be named a second element without departing from the scope of the examples, and similarly the second element can be named the first element.

In addition, in the disclosure, the term "application" indicates, for example, a series of computer program sets designed to perform a specific task. Various applications may be described in the specification. For example, the applications may include a game application, a video replay application, a map application, a memo application, a schedule management application, a phonebook application, a broadcast application, an exercise support application, a payment application, a photograph application, and the like but are not limited thereto.

In addition, in the disclosure, the term "identification information of an application" may, for example, be unique information for discriminating the application from the other applications, and the identification information of the application may include at least one of an image, a text, and a video. For example, the identification information of the application may include an icon, an index item, link information, a replayed image of content, and the like.

Reference will now be made in detail to examples, which are illustrated in the accompanying drawings, wherein like reference numerals refer to like elements throughout. In this regard, the examples may have different forms and should not be construed as being limited to the descriptions set forth herein. In the drawings, parts irrelevant to the description are omitted to more clearly describe the example. Accordingly, the examples are described below, by referring to the figures, to explain aspects thereof.

As used herein, expressions such as "at least one of," when preceding a list of elements, modify the entire list of elements and do not necessarily modify the individual elements of the list.

FIG. 1 illustrates an example execution operation of an application in a wearable device 100.

As shown in FIG. 1, the wearable device 100 may indicate a device usable by a user by wearing the device as if, for example, the device were a portion of the human body. According to an example, the wearable device 100 may be implemented in various forms. For example, the wearable device 100 may be a smart watch 100-1, a smart band 100-2, a helmet mounted display (HMD) device 100-3, clothes, or the like but is not limited thereto.

According to an example, the wearable device 100 may include a user interface configured to receive a user input. According to an example, the user input may, for example, include at least one of a touch input, a bending input, a motion input, a voice input, a key input, and a multimodal input but is not limited thereto.

In the disclosure, the term "touch input" indicates a gesture or the like performed by the user on a touch screen to control the wearable device 100. In addition, in the disclosure, the term "touch input" may include a touch in a state of being spaced apart by a predetermined distance or more from a touch screen without physically touching the touch screen (for example, floating or hovering).

For example, types of a touch input described in the disclosure may be a drag, a flick, a tap, a double tap, and the like.

The term "drag" indicates an operation in which, for example, the user touches a screen by using a finger or a touch tool and then moves the finger or the touch tool to another location on the screen in a state of maintaining the touch.

The term "tap" indicates an operation in which, for example, the user touches a screen by using a finger or a touch tool (e.g., an electronic pen) and then immediately lifts the finger or the touch tool from the screen without moving.

The term "double tap" indicates an operation in which, for example, the user touches a screen twice by using a finger or a touch tool (e.g., a stylus).

The term "flick" indicates a drag operation at a critical speed or more, which is performed, for example, by the user using a finger or a touch tool. A drag and a flick may be discriminated from each other based on whether a moving speed of the finger or the touch tool is the critical speed or more, but in the disclosure, the term "flick" is included in the term "drag".

The term "swipe" indicates an operation, for example, of moving a finger or a touch tool by a predetermined distance in a left/right or up/down direction in a state of touching a predetermined region on a screen by using the finger or the touch tool. A motion in a diagonal direction may not be recognized as a swipe event. In the disclosure the term "swipe" is included in the term "drag".

The term "touch and hold" indicates an operation, for example, in which the user touches a screen by using a finger or a touch tool (e.g., a stylus) and then maintains the touch input for a critical time or more. That is, a time difference between a touch-in time point and a touch-out time point is the critical time or more. In order for the user to recognize whether a touch input is a tap or a touch and hold, when the touch input is maintained for the critical time or more, a visual or auditory feedback signal may be provided.

The term "drag and drop" indicates an operation, for example in which the user drags identification information of an application to a predetermined location on a screen and drops the identification information of the application at the predetermined location by using a finger or a touch tool.

The term "motion input" may indicate a motion applied by the user to the wearable device 100 to control the wearable device 100. For example, types of a motion input may be an input of rotating the wearable device 100 by the user, an input of tilting the wearable device 100 by the user, and an input of vertically or horizontally moving the wearable device 100 by the user. The wearable device 100 may detect a motion input preset by the user by using, for example, an acceleration sensor, a tilt sensor, a gyro sensor, a three-axis magnetic sensor, and the like.

The term "bending input" indicates an input of bending the entire or a partial region of the wearable device 100 by the user to control the wearable device 100 if the wearable device 100 is a flexible device. For example, the wearable device 100 may detect a bending location (a coordinate value), a bending direction, a bending angle, a bending speed, the number of bending times, a bending operation occurrence time point, a bending operation maintaining time, and the like by using a bending sensor.

The term "key input" indicates an input for controlling the wearable device 100 by the user by using a physical key attached to the wearable device 100.

The term "multimodal input" indicates a combination of at least two input schemes. For example, the wearable device 100 may receive a touch input and a motion input of the user or a touch input and a voice input of the user. Alternatively, the wearable device 100 may receive a touch input and an eyeball input of the user. The eyeball input indicates an input for controlling eye blinking, a gaze location, an eyeball moving speed, or the like by the user to control the wearable device 100.

According to an example, the wearable device 100 may include a communication unit for example in the form of communication circuitry configured to receive an application execution command from an external device (not shown) connected to the wearable device 100.

The external device may, for example, be a cellular phone, a smartphone, a laptop computer, a tablet PC, an e-book terminal, a digital broadcast terminal, a personal digital assistant (PDA), a portable multimedia player (PMP), a navigation machine, an MP3 player, or the like but is not limited thereto.

For example, the user may request the wearable device 100 to execute an application installed in the wearable device 100 through a cellular phone, a smartphone, a laptop computer, a tablet PC, a navigation machine, or the like connected to the wearable device 100. The external device may transmit an application execution command to the wearable device 100 by, for example, using short-distance communication (e.g., Bluetooth, near-field communication (NFC), or Wi-Fi Direct (WFD)).

According to an example, the wearable device 100 may execute an application in response to a user input. The user input may be an input for requesting for execution of the application.

In addition, the wearable device 100 may execute an application of the wearable device 100 by receiving an execution command from the external device connected to the wearable device 100.

According to an example, the wearable device 100 may provide an execution waiting screen image by acquiring time information required until execution of an application (hereinafter, for convenience of description, referred to as "required time information"). The execution waiting screen image may include a predetermined image. The predetermined image may include a gradation image or an image pre-defined by the user.

According to an example, the wearable device 100 may acquire time information required until execution of an application after receiving a user input by using the performance of the wearable device 100, a load of the wearable device 100, a load of the application, and the like.

The wearable device 100 may display an execution waiting screen image based on acquired time information. For example, the wearable device 100 may acquire first required time information (e.g., one second) until execution of a first application (e.g., a schedule management application) and acquire second required time information (e.g., 2 seconds) until execution of a second application (e.g., a camera application). The wearable device 100 may provide an execution waiting screen image for the first required time information (e.g., 1 second) until the execution of the first application or provide an execution waiting screen image for the second required time information (e.g., 1 second) until the execution of the second application. Therefore, according to an example, the wearable device 100 may provide an execution waiting screen image corresponding to a launching time for each application.

As such, the wearable device 100 may reduce a sensible waiting time which may be recognized by the user by providing an execution waiting screen image for a time required to launch each application. In addition, the wearable device 100 may also provide a smooth application launching effect to the user by providing an execution waiting screen image.

An application execution operation in the wearable device 100 and a method of providing an execution waiting screen image will now be described in detail with reference to FIG. 2.

Figure 2:
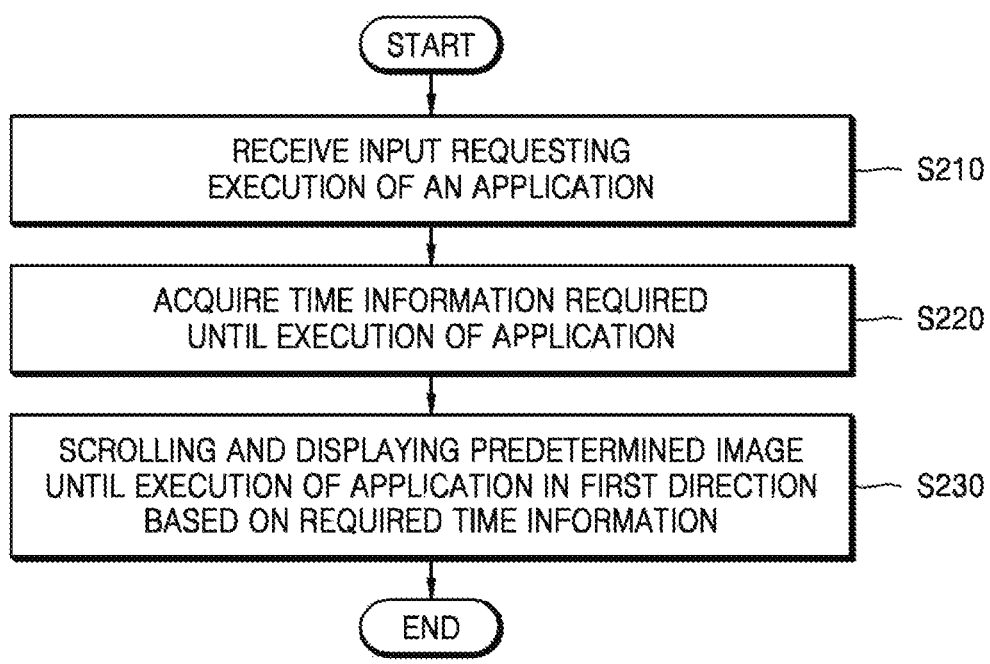
FIG. 2 is a flowchart illustrating an example method of executing an application in a wearable device.

FIG. 2 is a flowchart illustrating an example method of executing an application in the wearable device 100.

In operation S210, the wearable device 100 may receive an input requesting execution of an application.

According to an example, the wearable device 100 may receive an input requesting execution of an application on a screen on which identification information of the application is displayed.

According to an example, the wearable device 100 may receive a drag input in a first direction on the screen on which identification information of an application is displayed. For example, the first direction may be a direction orienting from a predetermined region of a lower end of the screen of the wearable device 100 (e.g., a bezel region in the lower end) to an upper end thereof. Alternatively, the first direction may be a direction orienting from a predetermined region of the upper end of the screen of the wearable device 100 (e.g., a bezel region in the upper end) to the lower end thereof. Alternatively, the first direction may be a direction orienting from a predetermined region of a left side (or a right side) of the screen of the wearable device 100 to the right side (or the left side) thereof.

According to an example, the wearable device 100 may receive a drag input in the first direction on the screen on which identification information of a plurality of applications are displayed. The wearable device 100 may divide the screen into regions respectively corresponding to the identification information of the plurality of applications and determine whether an input is received within a region corresponding to the identification information of each application. If a drag input in the first direction is received within a region including identification information of the first application (e.g., the schedule management application), the wearable device 100 may recognize the drag input as an input for requesting for execution of the first application.

According to an example, the wearable device 100 may receive a motion input of tilting or moving the wearable device 100 in the first direction as an input for requesting for execution of an application on the screen on which identification information of the application is displayed.

According to an example, the wearable device 100 may receive a bending input of bending the wearable device 100 in the first direction as an input for requesting for execution of an application on the screen on which identification information of the application is displayed.

According to an example, the wearable device 100 may receive a voice input for requesting for execution of an application According to an example, the wearable device 100 may receive a key input preset as an input for requesting for execution of an application on the screen on which identification information of the application is displayed. The preset key may be a physical key attached to the wearable device 100 or a virtual key in the form of a graphical user interface (GUI).

In operation S220, the wearable device 100 may acquire time information required until the execution of the application (i.e., required time information) in response to the input for requesting for the execution of the application.

According to an example, the time information required until the execution of the application may be a time required until a task for displaying a splash image of the application is completed after receiving the input for requesting for the execution of the application.

In the disclosure, the term "splash image" may, for example, be an image through which information on an application may be delivered, and a splash image may include a name, a logo, update information, and the like of an application. A splash image may indicate an image displayed while loading a main program of an application after starting the application. In addition, a splash image may be displayed while performing an update task or the like of an application but is not limited thereto.

According to an example, the time information required until the execution of the application may be information on a time required until a task for displaying a finally displayed image in execution of a previous application is completed.

According to an example, the time information required until the execution of the application may be information on a time required until an initialization task including memory loading for executing the application is completed after receiving the input for requesting for the execution of the application.

Alternatively, the time information required until the execution of the application may be information on a time required until a main process of the application of the wearable device 100 is scheduled by an operating system scheduler after receiving the input for requesting for the execution of the application.

Alternatively, the time information required until the execution of the application may be information on a time required until the wearable device 100 completes rendering on an initial image of the application after receiving the input for requesting for the execution of the application.

According to an example, the time information required until the execution of the application may be acquired based on at least one of the performance of the wearable device 100, a load of the wearable device 100, and a load of the application.

The performance of the wearable device 100 or the load of the wearable device 100 may include information about frames per second (FPS), million instructions per second (MIPS), an interrupt delay time, an interrupt service routine processing delay time, a scheduling delay time, a context switch delay time, a task preoccupation delay time, the number of processors of the wearable device 100, the number of applications being executed in the wearable device 100, and the like.

For example, even required time information of a same application may vary based on an execution time point. For example, if three applications are being executed at a first time point where the first application is executed, a time required to execute the first application at the first time point may be "2 seconds", if five applications are being executed at a second time point where the first application is executed, a time required to execute the first application at the second time point may be "2.5 seconds".

The load of the application may, for example, include information about a size (a memory occupation amount) and a code amount of the application, whether a network is used when loading the application, and the like.

According to an example, when the time information required until the execution of the application is pre-stored in a memory, the wearable device 100 may extract the time information required until the execution of the application from the memory based on identification information of the application. The time information stored in the memory may be an average value of time information required until execution of a specific application, which has been acquired by the wearable device 100 a plurality of times.

According to an example, the wearable device 100 may store the required time information acquired based on at least one of the performance of the wearable device 100, the load of the wearable device 100, and the load of the application by mapping the required time information to the identification information of the application.

In operation S230, the wearable device 100 may display a predetermined image while scrolling the predetermined image in the first direction until the execution of the application based on the acquired required time information. The predetermined image may include a gradation image, a pre-defined image, and the like. Herein, the term "scroll" (or scrolling) indicates that, for example, when an amount of information to be displayed on a screen is greater than a screen displayable amount of a display device, if information displayed on the screen is moved in a up/down or left/right direction, new information corresponding to a disappearing portion from the screen appears from an opposite direction to the moving direction.

According to an example, the wearable device 100 may display a predetermined image while scrolling the predetermined image in the up/down or left/right direction and display a new image (e.g., an execution window of an application) continuing to the predetermined image.

Alternatively, the wearable device 100 may sequentially display a screen image in which identification information of an application is displayed and a gradation image while scrolling the screen image and the gradation image in the first direction. The gradation image may be an image generated by the wearable device 100 based on a color of the screen on which the identification information of the application is displayed and a color of an application execution window.

According to an example, the wearable device 100 may sequentially display a screen image in which identification information of an application is displayed and a pre-defined image while scrolling the screen image and the predetermined image in the first direction. The pre-defined image may have a constant length.

According to an example, the wearable device 100 may determine a speed of scrolling the screen in the first direction based on a drag input speed of the user or a preset scroll speed. The preset scroll speed may be set depending on the wearable device 100 or set by the user.

According to an example, the wearable device 100 may determine a length of a gradation image based on required time information of an application and scroll speed information.

For example, the wearable device 100 may generate a longer gradation image as a time required to execute an application is longer when a scroll speed is constant.

Alternatively, the wearable device 100 may determine a length of a gradation image based on time information required until execution of an application and a predetermined reference (e.g., a pre-defined table) but is not limited thereto.

According to an example, the wearable device 100 may adjust a scroll speed for a predetermined image based on required time information of an application and a length of the predetermined image.

For example, if a length of the predetermined image is constant, the wearable device 100 may adjust a scroll speed for the predetermined image based on required time information of an application. An example method by which the wearable device 100 adjusts a scroll speed will be described below in detail with reference to FIG.

According to an example, the wearable device 100 may display an execution window of an application next to a predetermined image by scrolling the predetermined image in the first direction. For example, the wearable device 100 may display an application execution window from a lower end of the screen as much as a predetermined image disappears to an upper end thereof.

The wearable device 100 may perform a necessary task until execution of an application while displaying a predetermined image. Therefore, the wearable device 100 may provide an execution window of the application to the user next to the predetermined image after completing launching of the application.

According to an example, the wearable device 100 may inform the user that an application is normally being executed, by providing a gradation image or the like instead of a blank image (e.g., a black screen image due to a screen image change) or a still image (e.g., an afterimage on the screen on which identification information of the application is displayed) until execution of the application after receiving an input for requesting for the execution of the application. In addition, the wearable device 100 may provide a smooth application launching effect by providing a gradation image or a pre-defined image until execution of an application.

Figure 3A:
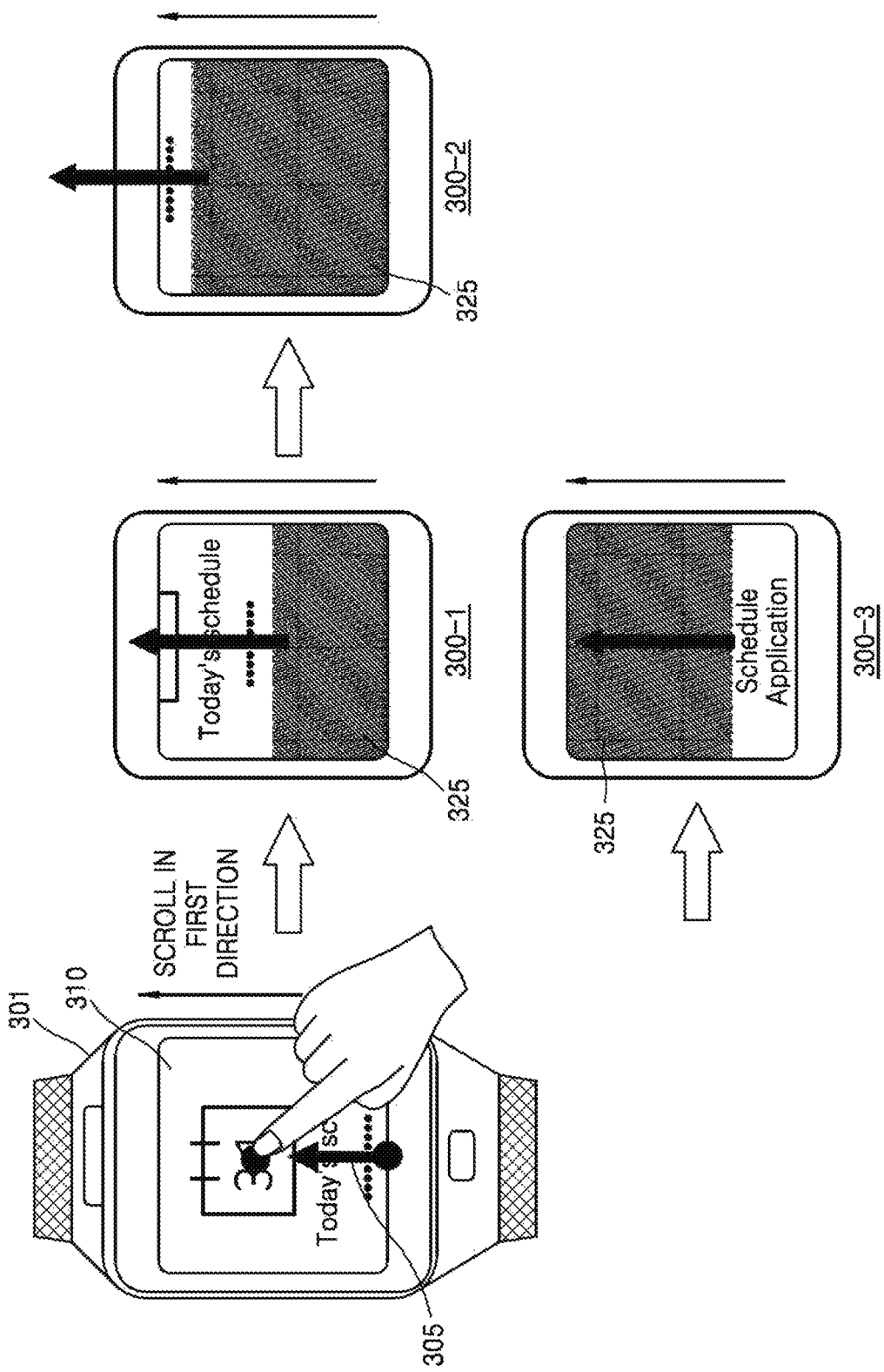
FIGS. 3A and 3B illustrate examples in which a wearable device executes an application.
Figure 3B:
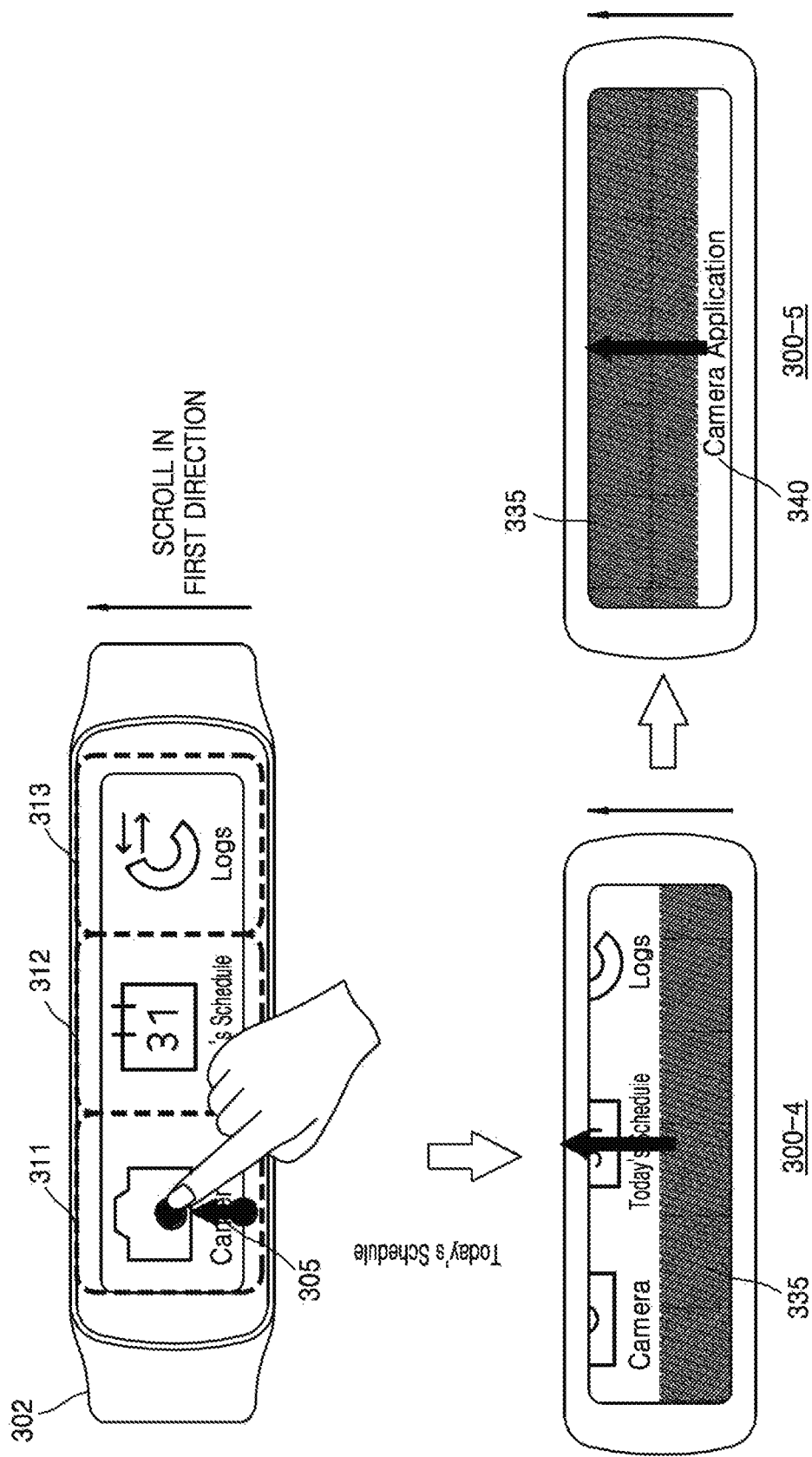

FIGS. 3A and 3B illustrate examples in which the wearable device 100 executes an application.

FIG. 3A illustrates an example in which the wearable device 100 is a smart watch 301, and FIG. 3B illustrates an example in which the wearable device 100 is a smart band 302.

As shown in FIG. 3A, the smart watch 301 may display identification information 310 of the schedule management application. Thereafter, the smart watch 301 may receive a drag input 305 from a lower end of a screen to an upper end.

The smart watch 301 may acquire time information required until execution of the schedule management application in response to the drag input 305. For example, the smart watch 301 may acquire time information (e.g., 1 second) required until a splash image of the schedule management application is displayed. The required time information (e.g., 1 second) may be acquired based on the number of applications being executed in the smart watch 301 when the user inputs the drag input 305, a memory occupation amount of the schedule management application, and the like.

The smart watch 301 may determine a length (e.g., 100 pixels) of a gradation image 325 based on a dragging speed (e.g., 100 pixels/s) of the user and the required time information (e.g., 1 second).

The smart watch 301 may sequentially display the identification information 310 of the schedule management application and the gradation image 325 while scrolling the screen from the lower end to the upper end in operation 300-1. In this case, the smart watch 301 may display the gradation image 325 for the time (e.g., 1 second) required until execution of the schedule management application. For example, the smart watch 301 may display the gradation image 325 of the determined length (e.g., 100 pixels) while scrolling the screen from the lower end to the upper end at a constant speed (e.g., 100 pixels/s) in operation 300-2.

The smart watch 301 may display an execution window 330 of the schedule management application next to the gradation image 325 while scrolling the screen from the lower end to the upper end in operation 300-3.

For example, the smart watch 301 may display the execution window of the schedule management application from a time point where the display of the gradation image 325 ends by scrolling the screen from the lower in operation 300-3.

As shown in FIG. 3B, the smart band 302 may provide a screen including identification information of a plurality of applications. For example, the smart band 302 may display a first icon corresponding to a camera application, a second icon corresponding to the schedule management application, and a third icon corresponding to a call history application on the screen.

The smart band 302 may divide the screen into a first region 311 in which the first icon is displayed, a second region 312 in which the second icon is displayed, and a third region 313 in which the third icon is displayed and may recognize a user input (e.g., a drag input) input on each region. For example, if an input 315 of dragging the first region 311 from a lower end of the first region 311 to an upper end thereof is received, the smart band 302 may recognize the input 315 as an input for requesting for execution of the camera application, and if an input (not shown) of dragging the second region 312 from a lower end of the second region 312 to an upper end thereof is received, the smart band 302 may recognize the received input as an input for requesting for execution of the schedule management application.

The smart band 302 may acquire time information (e.g., 1.5 seconds) required until execution of the camera application based on the number of applications being executed in the smart band 302, a memory occupation amount of the camera application, and the like in response to the drag input 315 of the user. The smart band 302 may determine a length (e.g., 120 pixels) of a gradation image 335 corresponding to a dragging speed (e.g., 80 pixels/s) of the user and the required time information (e.g., 1.5 seconds).

The smart band 302 may sequentially display a screen image on which the identification information of the plurality of applications and the gradation image 335 while scrolling the screen image and the gradation image 335 in operation 300-4. The smart band 302 may display the gradation image 335 by scrolling the screen from the lower end to the upper end according to the dragging speed (e.g., 80 pixels/s) of the user. The smart band 302 may sequentially display an execution window 340 of the camera application from a time point where displaying of the gradation image 335 ends by scrolling the screen from the lower end of the screen in operation 300-5.

The smart band 302 may acquire time information (e.g., 1.2 seconds) required until execution of the schedule management application in response to an input (not shown) of the user for requesting for execution of an application in the second region 312. Even though the schedule management application is implemented in each device (e.g., the smart watch 301 or the smart band 302) in a similar manner, the required time information (e.g., 1.2 seconds) acquired by the smart band 302 for the schedule management application may differ from the required time information (e.g., 1 seconds) acquired by the smart watch 301 of FIG. 3A.

Required time information for the same schedule management application may vary depending on the wearable device 100 since a load of each wearable device 100 varies at a time point where the schedule management application is executed or since the performance of each wearable device 100 varies.

As described above, the wearable device 100 may inform the user that an application is being executed normally, by providing a change in a screen image until execution of the application to the user for each application.

In addition, the wearable device 100 may provide a smooth application launching effect to the user by naturally changing a color of the screen through a gradation image generated immediately after a drag input of the user.

Figure 4:
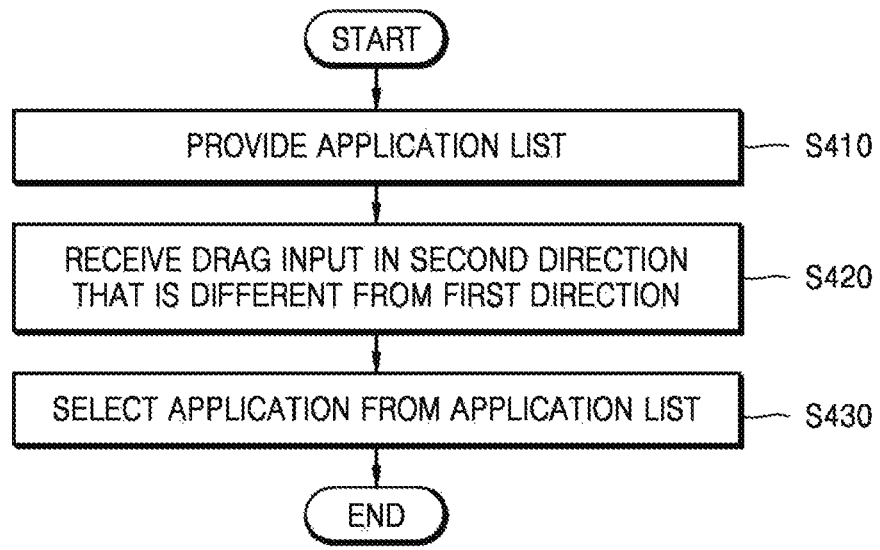
FIG. 4 is a flowchart illustrating an example method of selecting an application in a wearable device.

FIG. 4 is a flowchart illustrating an example method of selecting an application in the wearable device 100.

In operation S410, the wearable device 100 may provide an application list including identification information of at least one application.

In the disclosure, the term "application list" may, for example, indicate identification information of applications executable in the wearable device 100, which is sorted in a predetermined order.

For example, the application list may be in the form of icons or the like corresponding to the at least one application, which are sorted in a use frequency order. In addition, an arrangement order of the identification information of the at least one application included in the application list may be changed by the user. A method by which the user changes an arrangement order of identification information of applications in the wearable device 100 will be described below in detail with reference to FIG. 6.

In operation S420, the wearable device 100 may receive a drag input in a second direction that is different from the first direction. The first direction may be a direction in which identification information of an application, a gradation image, and an execution window of the application are sequentially scrolled. The second direction may be a direction in that the application list is scrolled.

According to an example, the second direction may different from the first direction. For example, when the first direction orients from the lower end of the screen to the upper end, the second direction may be the left/right direction of the screen. Alternatively, when the first direction orients from the right of the screen to the left, the second direction may be the up/down direction of the screen.

According to an example, the wearable device 100 may receive an input of dragging, in the second direction, the screen on which the application list is displayed.

According to an example, the wearable device 100 may receive an input of lifting or moving, in the second direction, the screen on which the application list is displayed.

According to an example, the wearable device 100 may receive a bending input of bending, in the second direction, the screen on which the application list is displayed.

According to an example, the wearable device 100 may receive a key input on the screen on which the application list is displayed. Alternatively, wearable device 100 may receive a voice input of commanding scroll of the application list.

According to an example, an amount of information provided by the application list of the wearable device 100 may be greater than a screen displayable amount of the wearable device 100. In this case, the wearable device 100 may display, on the screen, only identification information of a portion of the at least one application included in the application list.

The wearable device 100 may display the application list while scrolling the application list in the second direction in response to the received input.

In operation S430, the wearable device 100 may select an application from the application list based on a received input.

According to an example, the wearable device 100 may display identification information of a specific application included in the application list based on a drag input in the second direction. If the identification information of the specific application is displayed on the screen, the wearable device 100 may determine that the user has selected the specific application.

For example, the application list in the wearable device 100 may include first identification information corresponding to a first application, second identification information corresponding to a second application, third identification information corresponding to a third application, and the like. The wearable device 100 may display the first identification information in the application list by receiving an input of dragging, from the left to the right, the screen on which the second identification information is displayed. In this case, the wearable device 100 may recognize that the first application has been selected.

The wearable device 100 may display the third identification information in the application list by receiving an input of dragging, from the right to the left, the screen on which the second identification information is displayed. In this case, the wearable device 100 may recognize that the third application has been selected.

According to an example, the wearable device 100 may select a specific application from the application list based on a motion input of lifting or moving the screen in the second direction.

According to an example, the wearable device 100 may select a specific application from the application list based on a bending input of bending the screen in the second direction.

According to an example, the wearable device 100 may select a specific application from the application list based on a key input or a voice input.

According to an example, the wearable device 100 may display, on the screen, identification information of the selected application.

According to an example, the wearable device 100 may display, on the screen, identification information of a plurality of applications, which includes the identification information of the selected application.

For example, the application list in the wearable device 100 may include the first identification information corresponding to the first application, the second identification information corresponding to the second application, the third identification information corresponding to the third application, and the like. The wearable device 100 may display both the first identification information and the second identification information on the screen. The wearable device 100 may select the third application based on an input of dragging the screen from the right to the left. When the third application is selected, the wearable device 100 may display both the third identification information of the selected third application and the second identification information.

The selected application may receive an additional input (e.g., a drag input in the first direction) and perform an operation responding to the received input (e.g., execution of the application or the like).

Figure 5A:
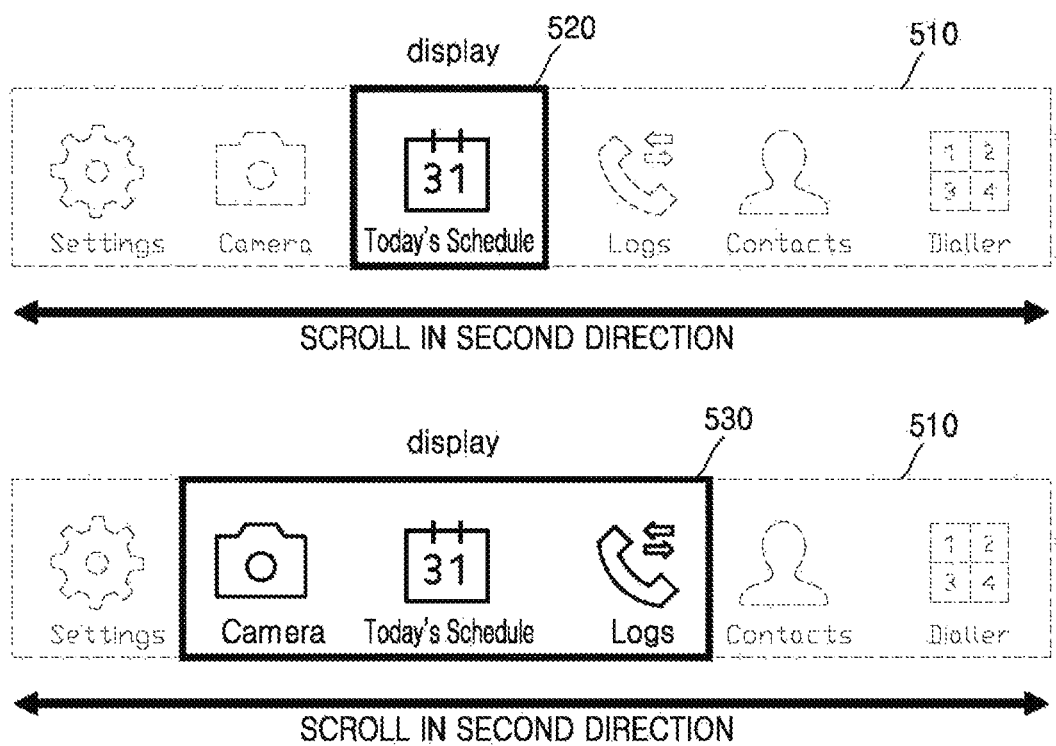
FIGS. 5A and 5B illustrate an example application list provided by a wearable device and an example of selecting an application in the wearable device.
Figure 5B:
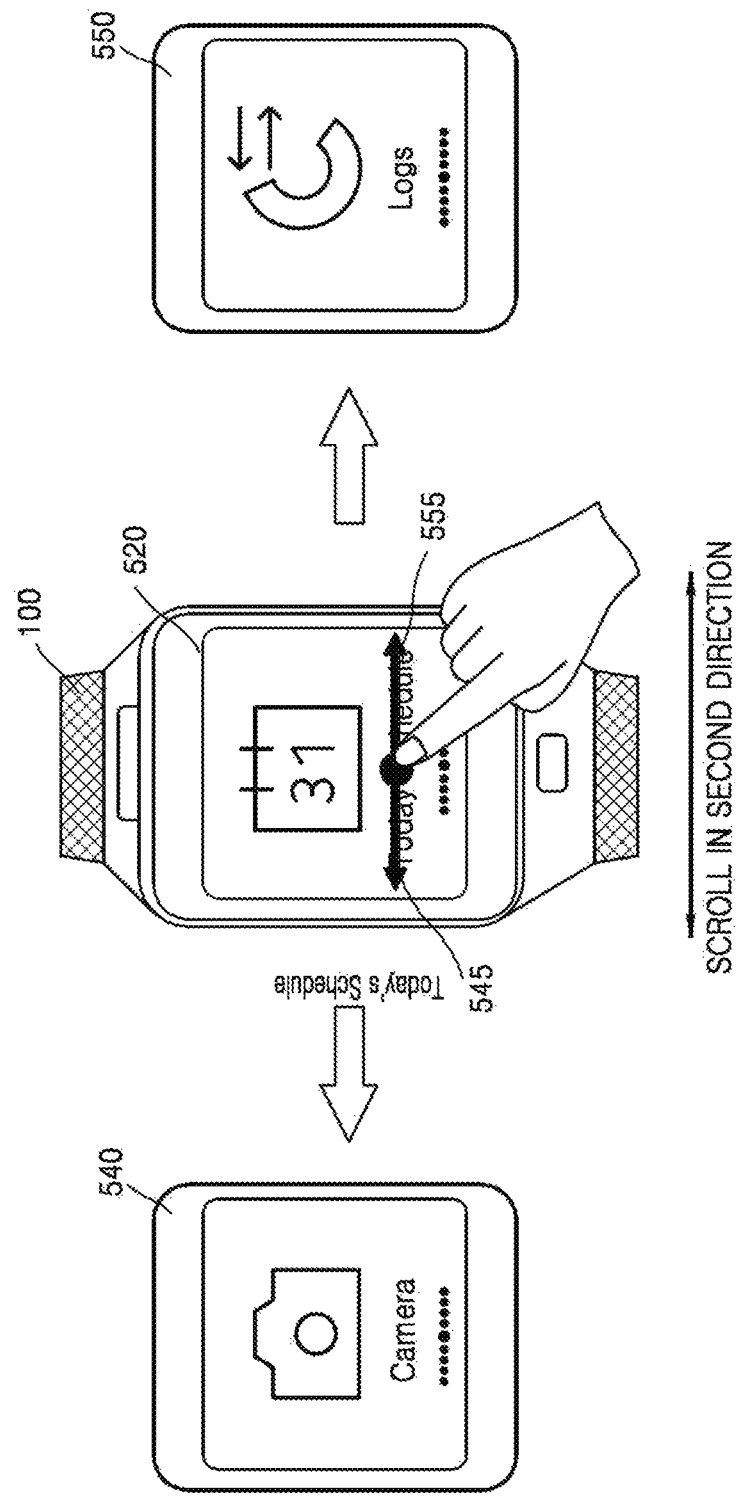

FIGS. 5A and 5B illustrate an application list 510 provided by the wearable device 100 and an example of selecting an application in the wearable device 100.

FIG. 5A illustrates an example in which the application list 510 provided by the wearable device 100 is displayed on the screen.

As shown in FIG. 5A, the application list 510 in the wearable device 100 may include first identification information (e.g., "Camera") of the camera application, second identification information (e.g., "Today's Schedule") of the schedule management application, third identification information (e.g., "Logs") of the call history application, and the like.

The wearable device 100 may display a screen image including identification information of at least one application in the application list 510 based on a screen displayable area of the wearable device 100, a size of the identification information of the at least one application, and the like.

For example, the wearable device 100 may display a screen image 520 including the second identification information (e.g., "Today's Schedule") in the application list 510.

Alternatively, the wearable device 100 may display a screen image 530 including the first identification information (e.g., "Camera"), the second identification information (e.g., "Today's Schedule"), and the third identification information (e.g., "Logs") in the application list 510.

The application list 510 in the wearable device 100 may be displayed by being scrolled in the second direction (e.g., in the left/right direction).

FIG. 5B illustrates an example of selecting a specific application from the wearable device 100 based on a drag input in the second direction.

As shown in FIG. 5B, the wearable device 100 may receive a drag input of the user on the screen image 520 including the second identification information (e.g., "Today's Schedule") included in the application list 510.

The drag input of the user may be a first input 545 of dragging the screen from the right to the left or a second input 555 of dragging the screen from the left to the right.

The wearable device 100 may display a screen image 540 including the first identification information (e.g., "Camera") based on the first input 545. In this case, the wearable device 100 may recognize that the camera application has been selected.

In addition, the wearable device 100 may display a screen image 550 including the third identification information (e.g., "Logs") based on the second input 555. In this case, the wearable device 100 may recognize that the call history application has been selected.

The user may execute the camera application by dragging the screen image 540 including the first identification information (e.g., "Camera") in the first direction (e.g., a direction of orienting from the lower end of the screen to the upper end thereof).

Figure 6:
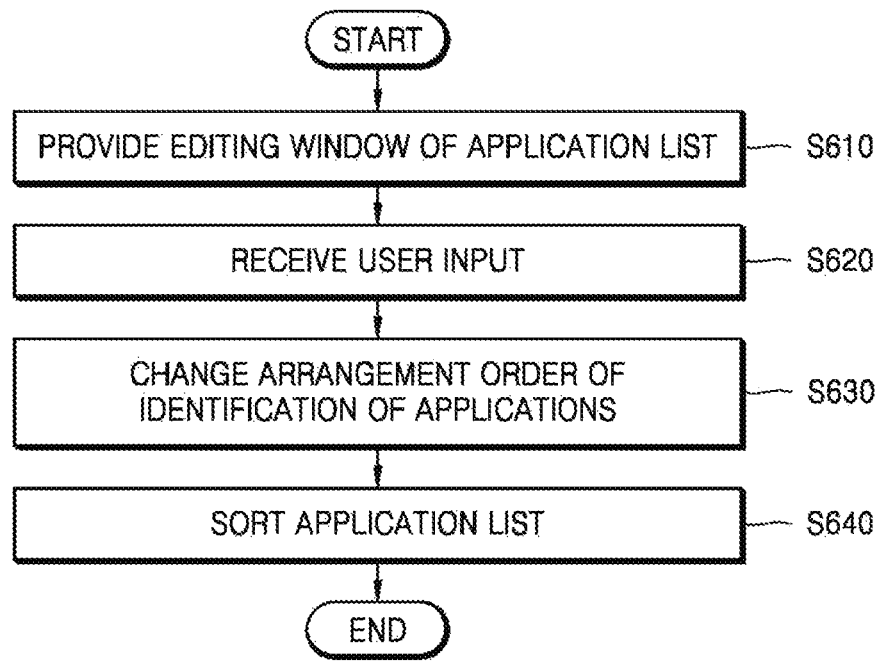
FIG. 6 is a flowchart illustrating an example method of changing an arrangement order of identification information of applications included in an application list in a wearable device.

FIG. 6 is a flowchart illustrating an example method of changing an arrangement order of identification information of applications in the wearable device 100.

In operation S610, the wearable device 100 may provide an editing window through which an arrangement order of identification information of applications may be changed (hereinafter, for convenience of description, referred to as "editing window").

According to an example, the wearable device 100 may provide an editing window in which identification information (e.g., text) of at least one application included in an application list is arranged and displayed according to an order of the application list.

For example, the editing window provided by the wearable device 100 may be arranged vertically and display identification information of a plurality of applications (e.g., name information of the applications) based on the order of the application list.

According to an example, the wearable device 100 may switch the screen on which the application list is displayed to the screen on which the editing window is displayed.

For example, the wearable device 100 may switch the screen on which the application list is displayed to the screen on which the editing window is displayed by receiving a touch & hold input of the user from the screen on which the application list is displayed. The wearable device 100 may inform the user that the application list has been switched to the editing window by providing a screen image in which identification information (e.g., icons) of applications, which is displayed on the screen, minutely shakes to the left and the right at a constant frequency (or a screen image in which a color or edge of the identification information of the applications has been changed).

In operation S620, the wearable device 100 may receive a user input for changing an arrangement order of the identification information of the applications.

According to an example, the wearable device 100 may provide a user interface through which the arrangement order of the identification information of the applications in the editing window may be changed. The wearable device 100 may receive a tap input of the user through the provided user interface.

For example, the wearable device 100 may provide an icon by which each of the identification information of the applications (e.g., name information of the applications) arranged vertically in the editing window may be moved upwards or downwards.

According to an example, the wearable device 100 may receive a drag & drop input of moving identification information of an application to an arbitrary location from the user. The arrangement order of the identification information of the applications may be changed based on the moved arbitrary location.

For example, the wearable device 100 may receive a drag & drop input of moving name information of a third application to between name information of a first application and name information of a second application in the editing window in which the name information of the first application and the name information of the second application, and the name information of the third application are vertically arranged.

In addition, the wearable device 100 may receive a drag & drop input of moving identification information of an application to an arbitrary location in the editing window.

In operation S630, the wearable device 100 may change an arrangement order of identification information of at least one applications based on a user input.

According to an example, the wearable device 100 may display the changed arrangement order of the identification information of the at least one application to the user through the editing window.

In operation S640, the wearable device 100 may sort the application list based on the changed arrangement order of the identification information of the at least one application.

According to an example, the wearable device 100 may sort the application list based on the arrangement order of the identification information of the applications, which has been changed through the editing window.

For example, when a location of the name information of the first application and a location of the name information of the second application are exchanged in the editing window, the wearable device 100 may provide an application list in which an order of an icon of the first application and an icon of the second application are exchanged.

Figure 7A:
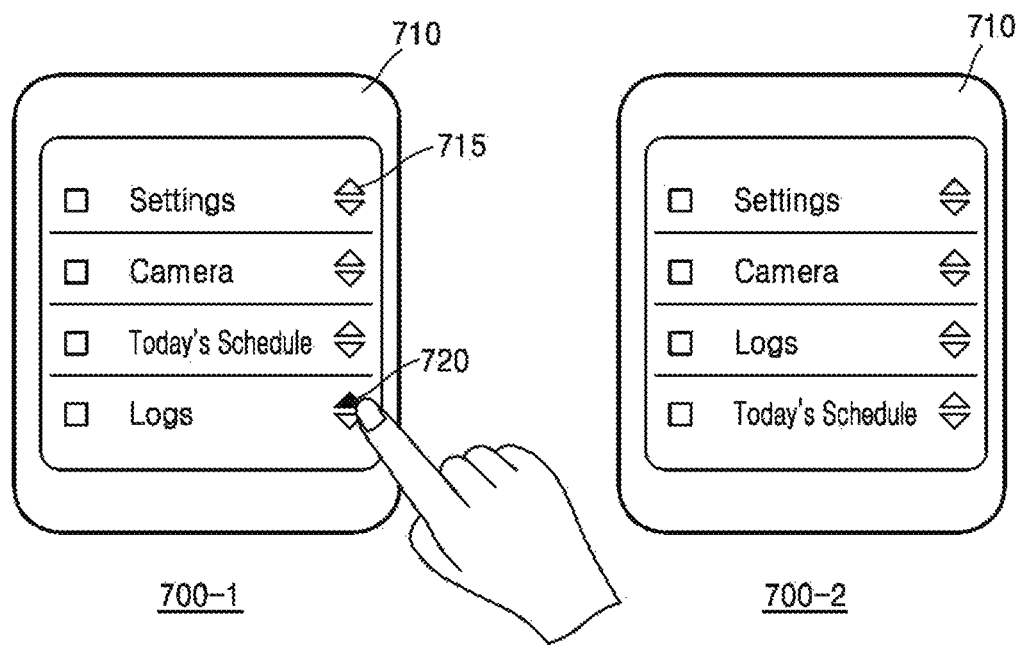
FIGS. 7A to 7C illustrate an example editing window provided by a wearable device and an example of an application list sorted in a changed order.
Figure 7B:
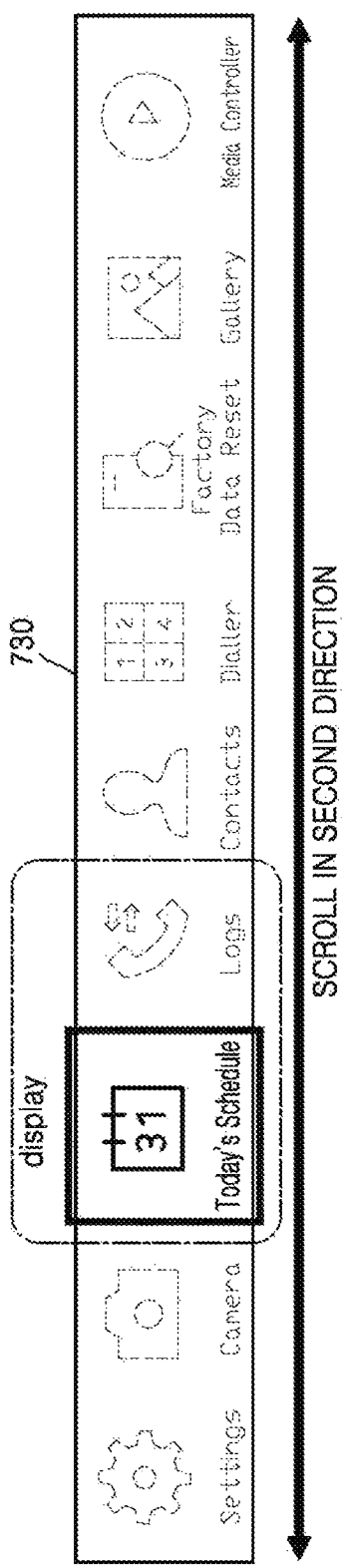
Figure 7C:
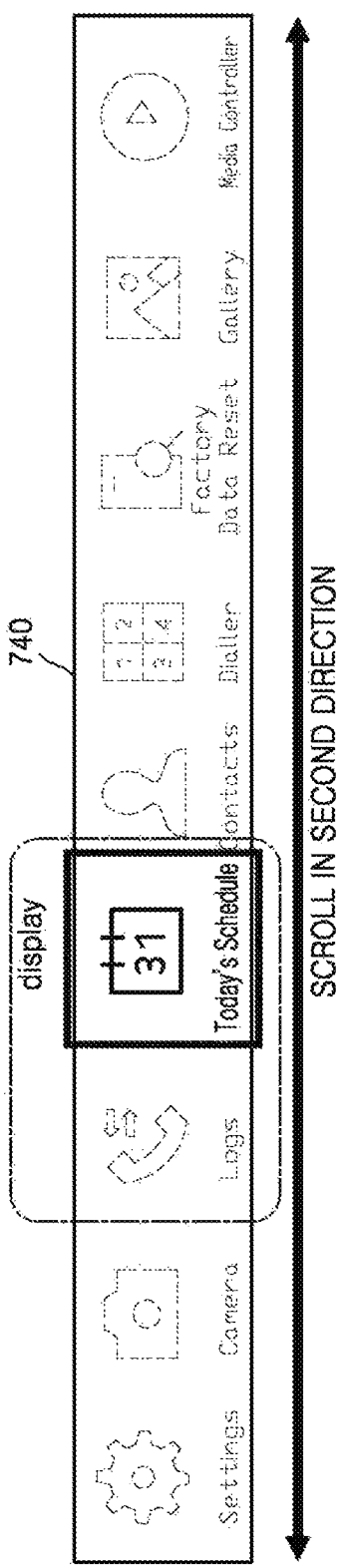

FIGS. 7A to 7C illustrate an editing window 710 provided by the wearable device 100 and an example of an application list sorted in a changed order.

FIG. 7A illustrates the editing window 710 provided by the wearable device 100.

As shown in FIG. 7A, the editing window 710 provided by the wearable device 100 may display identification information (e.g., "Settings") of at least one application included in an application list by vertically arranging the identification information (e.g., "Settings") of the at least one application in the order of the application list.

In this case, the editing window 710 provided by the wearable device 100 may include an icon 715 by which a location of identification information (e.g., "Settings") of each application arranged in the order of the application list may be moved upwards or downwards.

With reference to the reference number 700-1, the wearable device 100 may receive a tap input 720 on an icon from the user.

The wearable device 100 may change an arrangement order of the identification information (e.g., "Today's Schedule") of the schedule management application and the identification information (e.g., "Logs") of the call history application in response to the tap input 720 of the user.

With reference to the reference number 700-2, the arrangement order of the identification information of the at least one application, which has been changed by the user, may be displayed through the editing window 710.

FIG. 7B illustrates an example of an application list 730 before the arrangement order of the identification information of the at least one application is changed (700-1).

The application list 730 in the wearable device 100 may include the first identification information (e.g., "Camera") of the camera application, the second identification information (e.g., "Today's Schedule") of the schedule management application, the third identification information (e.g., "Logs") of the call history application, and the like.

FIG. 7C illustrates an example of an application list 740 after the arrangement order of the identification information of the at least one application is changed in the editing window 710 (700-2).

The wearable device 100 may sort the application list 740 in the changed arrangement order of the identification information (e.g., "Today's Schedule") of the schedule management application and the identification information (e.g., "Logs") of the call history application.

For example, the wearable device 100 may provide the application list 740 in which the order of the identification information (e.g., "Today's Schedule") of the schedule management application and the identification information (e.g., "Logs") of the call history application has been changed.

Figure 8:
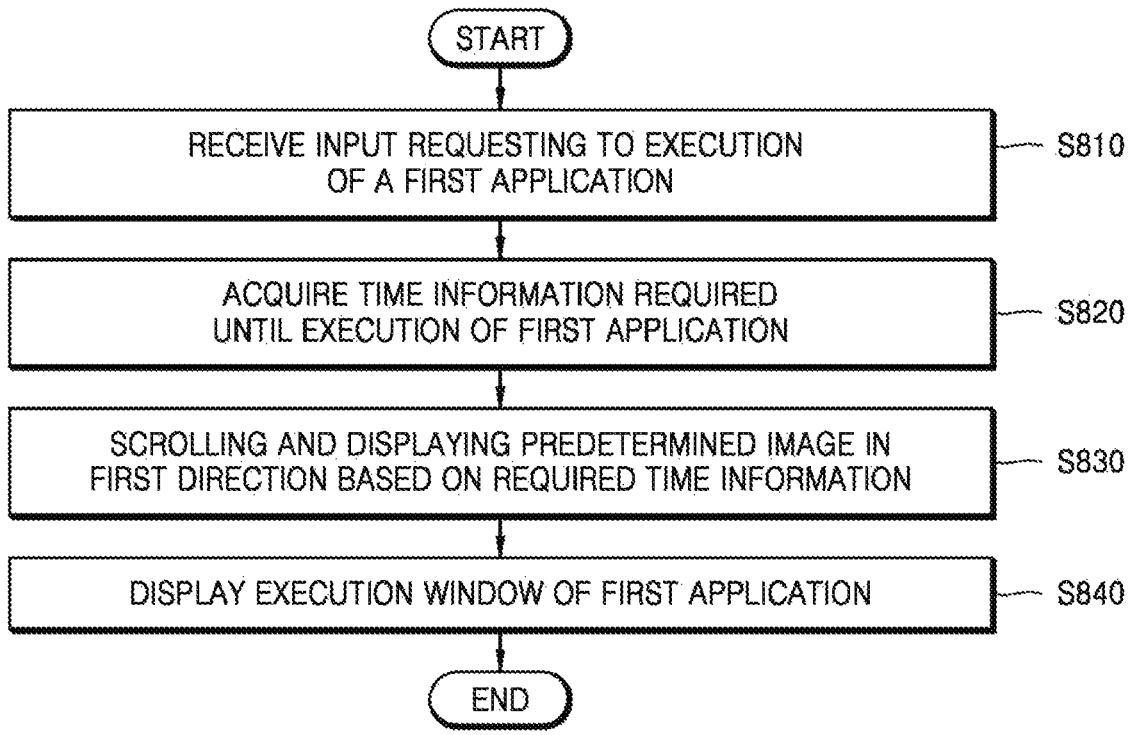
FIG. 8 is a flowchart illustrating an example method of displaying an execution window of an application in a wearable device.

FIG. 8 is a flowchart illustrating an example method of displaying an execution window of an application in the wearable device 100.

In operation S810, the wearable device 100 may receive an input requesting execution of an application. Operation S810 corresponds to operation S210 of FIG. 2, and thus a detailed description thereof is omitted.

In operation S820, the wearable device 100 may acquire time information required until the execution of the application in response to the input for requesting for the execution of the application. Operation S820 corresponds to operation S220 of FIG. 2, and thus a detailed description thereof is omitted.

In operation S830, the wearable device 100 may display a predetermined image while scrolling the predetermined image in the first direction until the execution of the application based on the acquired required time information. Operation S830 corresponds to operation S230 of FIG. 2, and thus a detailed description thereof is omitted.

According to an example, the wearable device 100 may display the predetermined image next to a screen image in which identification information of the application is displayed while scrolling the predetermined image in the first direction.

The predetermined image may have a different length for each application based on required time information of each application. Alternatively, the predetermined image may be displayed by a different speed for each application based on required time information of each application. A method by which the wearable device 100 adjusts a scroll speed will be described below in detail with reference to FIG. 12.

In operation S840, the wearable device 100 may display an execution window of the application.

According to an example, the wearable device 100 may display the execution window of the application next to the predetermined image while scrolling the predetermined image and the execution window of the application in the first direction (e.g., from the lower end of the screen to the upper end).

For example, the wearable device 100 may display the execution window of the application next to the predetermined image by connecting a lower end of the predetermined image and an upper end of the execution window of the application while scrolling the predetermined image and the execution window of the application in the first direction.

The execution window of the application may include a splash image of the application, an initial execution image of the application, and the like but is not limited thereto.

Figure 9:
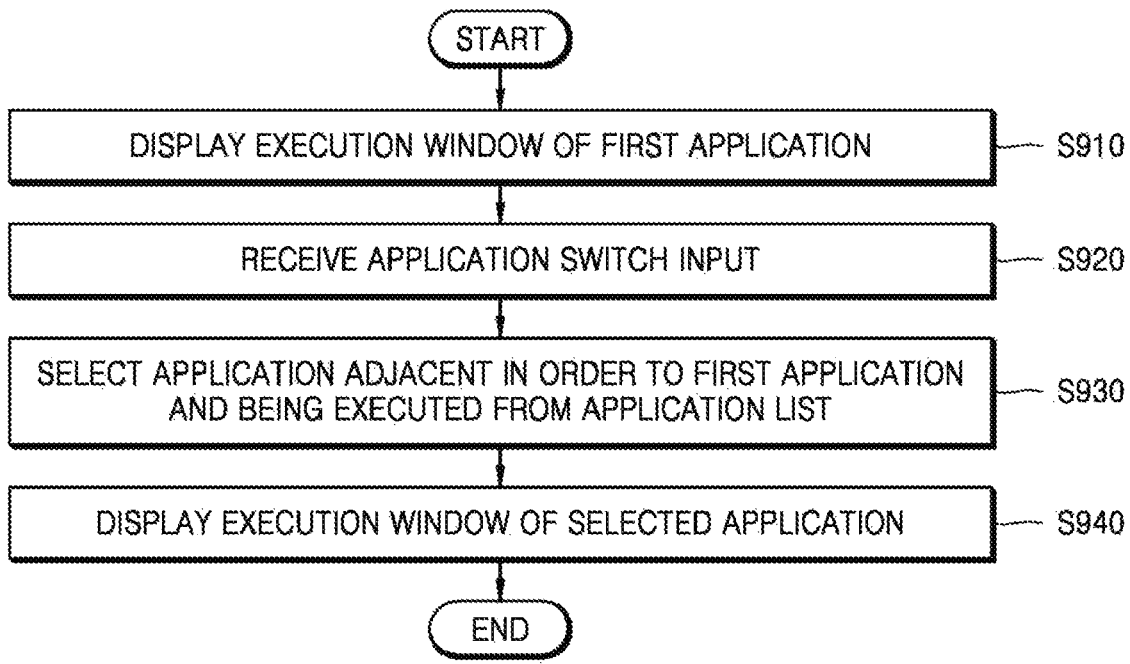
FIG. 9 is a flowchart describing an example switch operation between applications in a wearable device.

FIG. 9 is a flowchart describing a switch operation between applications in the wearable device 100.

In operation S910, the wearable device 100 may display an execution window of a first application. The first application may be one of executable applications provided in an application list. For example, the first application may be a configuration application, the schedule management application, the camera application, or the call history application.

In operation S920, the wearable device 100 may receive an application switch input while displaying the execution window of the first application.

According to an example, the application switch input may be a drag input in the second direction by using a plurality of fingers. Herein, the second direction may be identical to a direction of scrolling the application list.

For example, the wearable device 100 may receive a drag input in the left/right direction by using two fingers as the application switch input.

According to an example, the application switch input may be a motion input of moving or lifting the screen in the second direction.

According to an example, the application switch input may be a bending input of bending the screen in the second direction.

According to an example, the application switch input may be a key input or a voice input for commanding an application switch but is not limited thereto.

In operation S930, the wearable device 100 may select an application adjacent in the order to identification information of the first application and being executed from the application list.

For example, the wearable device 100 may provide an application list including first identification information of the first application, second identification information of a second application, third identification information of a third application, and fourth identification information of a fourth application in order. The wearable device 100 may receive an application switch input while displaying the execution window of the first application. If the second application and the third application are being executed, the wearable device 100 may select the second application adjacent in the order to the identification information of the first application and being executed. Alternatively, if the third application and the fourth application are being executed, the wearable device 100 may select the third application adjacent in the order to the identification information of the first application and being executed.

In operation S940, the wearable device 100 may display an execution window of the selected application.

According to an example, the wearable device 100 may display a latest execution window in a previous execution of the selected application.

Alternatively, the wearable device 100 may display an initial execution window of the selected application.

According to an example, the wearable device 100 may sequentially display the execution window of the first application and the execution window of the selected application while scrolling the execution window of the first application and the execution window of the selected application in the second direction.

According to an example, the wearable device 100 may sequentially display a screen image including the identification information of the second application next to a screen image including the identification information of the first application while scrolling the screen images in the second direction, based on a drag input in the second direction.

In addition, the wearable device 100 may sequentially display the execution window of the second application next to the execution window of the first application while scrolling the execution windows in the second direction, based on a drag input using a plurality of fingers in the second direction.

That is, the wearable device 100 may provide a consistent and intuitive user interface to the user by providing a movement between pieces of identification information of applications included in an application list and a movement between applications being executed, based on an input of dragging the screen in the second direction.

Figure 10:
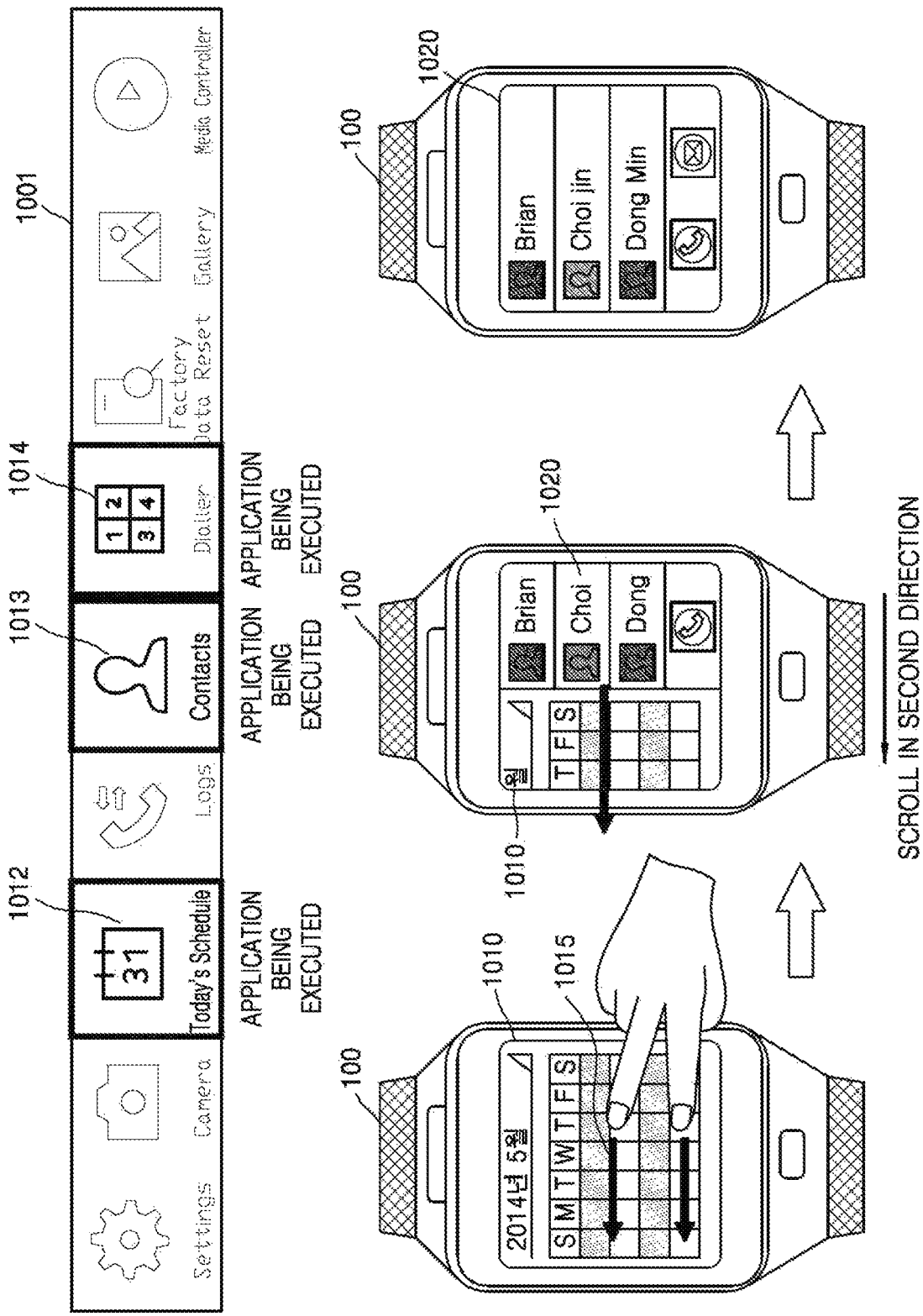
FIG. 10 illustrates an example of a switch between applications being executed.

FIG. 10 illustrates an example of a switch between applications being executed.

As shown in FIG. 10, an application list 1001 in the wearable device 100 may include first identification information 1012 of the schedule management application being executed, second identification information 1013 of an address book application being executed, and third information 1014 of a dialer application being executed.

The wearable device 100 may receive a switch input 1015 of dragging the screen from the left to the right with two fingers on an execution window 1010 of the schedule management application. The wearable device 100 may select the address book application corresponding to the second identification information 1013 adjacent in the order to the first identification information 1012 of the schedule management application, based on an arrangement order of application identification information in the application list 1001.

The wearable device 100 may sequentially display the execution window 1010 of the schedule management application and an execution window 1020 of the address book application while scrolling the screen from the right to the left in response to the switch input 1015.

In addition, the wearable device 100 may receive an input (not shown) of dragging the screen from the right to the left with two fingers on the execution window 1020 of the address book application and sequentially display the execution window 1020 of the address book application and an execution window (not shown) of the dialer application while scrolling the screen from the right to the left.

Figure 11:
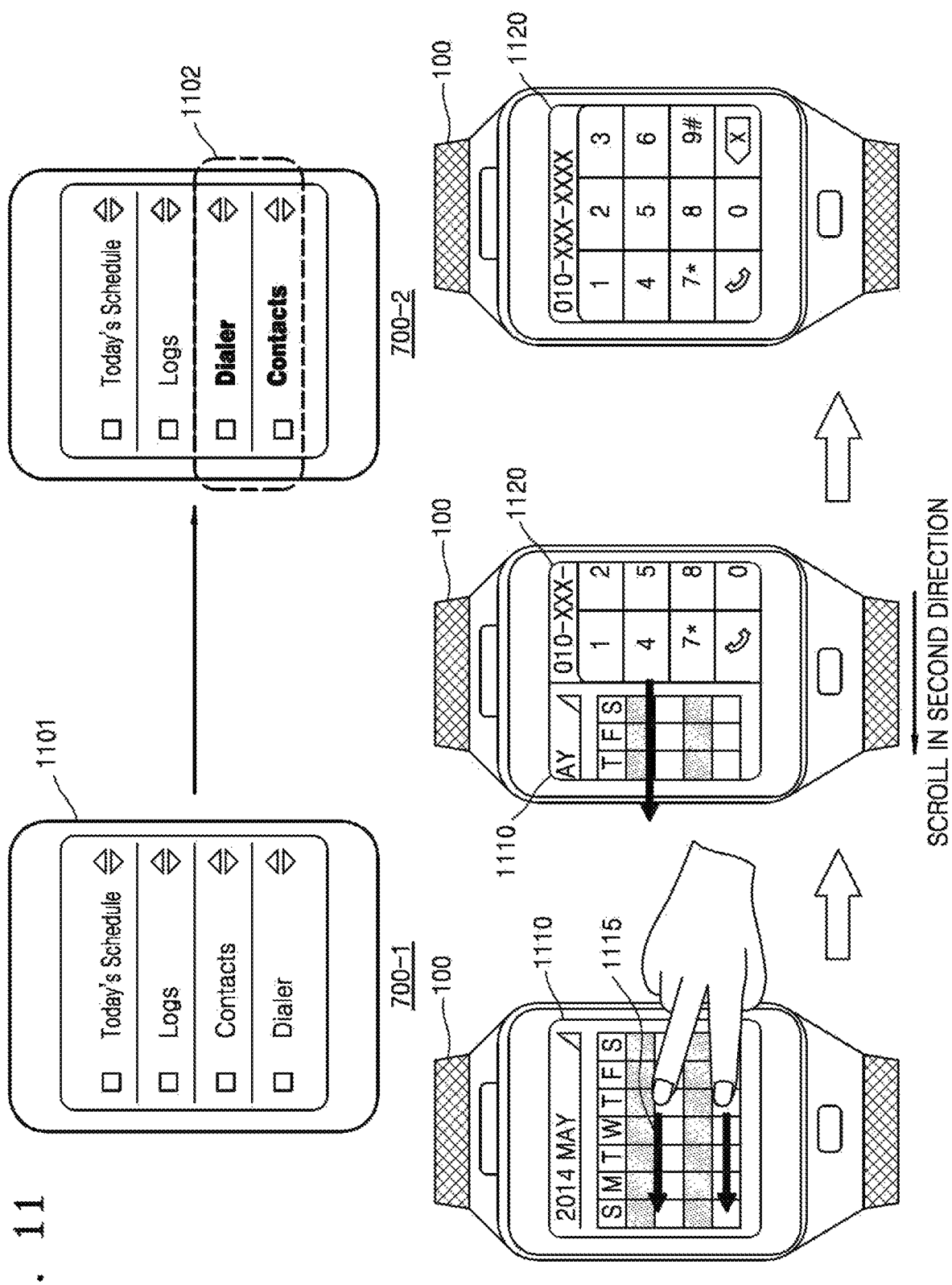
FIG. 11 illustrates an example of a switch between applications being executed according to a change in an arrangement order of identification information of the applications.

FIG. 11 illustrates an example of a switch between applications being executed based on a change in an arrangement order of identification information of the applications.

In FIG. 11, a case in which the application list 1001 in the wearable device 100 includes the first identification information 1012 of the schedule management application being executed, the second identification information 1013 of the address book application being executed, and the third information 1014 of the dialer application being executed as shown in FIG. 10 will be described as an example.

The wearable device 100 may provide an editing window 1101 through which the arrangement order of the identification information of the applications may be changed. The editing window 1101 corresponds to the editing window 701 of FIG. 7A, and thus a detailed description thereof is omitted.

The user may change an arrangement order of identification information (e.g., "Contacts") of the address book application and identification information (e.g., "Dialer") of the dialer application in the editing window 1101. The wearable device 100 may display the changed arrangement order 1102 of the identification information of the applications in the editing window 1101 and sort the application list 1001 based on the changed arrangement order 1102.

Therefore, the sorted application list (not shown) may include the first identification information 1012 of the schedule management application being executed, the third information 1014 of the dialer application being executed, and the second identification information 1013 of the address book application being executed, in order.

The wearable device 100 may receive a switch input 1115 of dragging the screen, on which an execution window 1110 of the schedule management application is displayed, from the right to the left with two fingers.

The wearable device 100 may select the dialer application corresponding to the third information 1014 adjacent in the order to the first identification information 1012 of the schedule management application being executed, unlike FIG. 10, based on the arrangement order of the identification information of the applications in the sorted application list.

The wearable device 100 may sequentially display the execution window 1110 of the schedule management application and an execution window 1120 of the dialer application while scrolling the screen from the right to the left in response to the switch input 1115.

Figure 12:
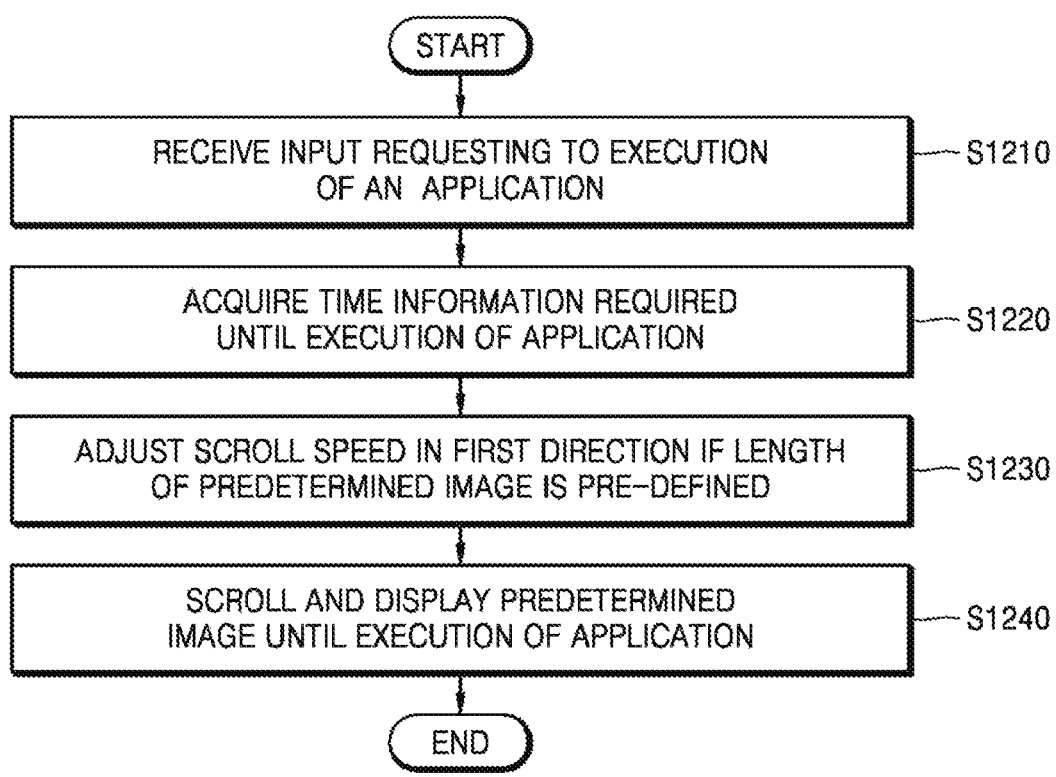
FIG. 12 is a flowchart illustrating an example method of adjusting a scroll speed of displaying a predetermined image in a wearable device.

FIG. 12 is a flowchart illustrating an example method of adjusting a scroll speed of a predetermined image in the wearable device 100.

In operation S1210, the wearable device 100 may receive an input requesting execution of an application. Operation S1210 corresponds to operation S210 of FIG. 2, and thus a detailed description thereof is omitted.

In operation S1220, the wearable device 100 may acquire time information required until the execution of the application in response to the input for requesting for the execution of the application. Operation S1220 corresponds to operation S220 of FIG. 2, and thus a detailed description thereof is omitted.

In operation S1230, if a length of a predetermined image is pre-defined, the wearable device 100 may adjust a speed of scrolling the predetermined image in the first direction based on the required time information. The predetermined image of which the length is pre-defined may include a user-designated image, a background image, a gradation image of which a length is constant, or the like.

According to an example, the wearable device 100 may adjust the speed of scrolling the predetermined image by using the length of the predetermined image and the required time information.

For example, the wearable device 100 may determine the speed (e.g., 100 pixels/s) of scrolling the user-designated image (or the background image) in the first direction based on the length (e.g., 100 pixels) of the user-designated image and the required time information (e.g., 1 second). The wearable device 100 may display the predetermined image by scrolling the predetermined image at a faster speed as a value of the required time information is smaller.

According to an example, the wearable device 100 may makes constant the length (e.g., a screen length) of a gradation image to be generated based on the required time information. If the gradation image of which the length is constant is generated, the wearable device 100 may determine a speed (e.g., 50 pixels/s) of scrolling the gradation image in the first direction based on the length (e.g., 100 pixels) of the gradation image and acquired required time information (e.g., 2 seconds).

Alternatively, the wearable device 100 may determine the speed of scrolling the predetermined image of which the length is pre-defined based on the time information required until the execution of the application and a predetermined reference (e.g., a pre-defined table). However, a method of determining the speed of scrolling the predetermined image is not limited thereto.

In operation S1240, the wearable device 100 may display the predetermined image until the execution of the application by scrolling the predetermined image in the first direction.

According to an example, the wearable device 100 may scroll the predetermined image by applying a different scroll speed for each application.

According to an example, the wearable device 100 may display an execution window of the application next to the predetermined image from a time point where the predetermined image ends while scrolling the screen from the lower end to the upper end.

Figures 13A, 13B:
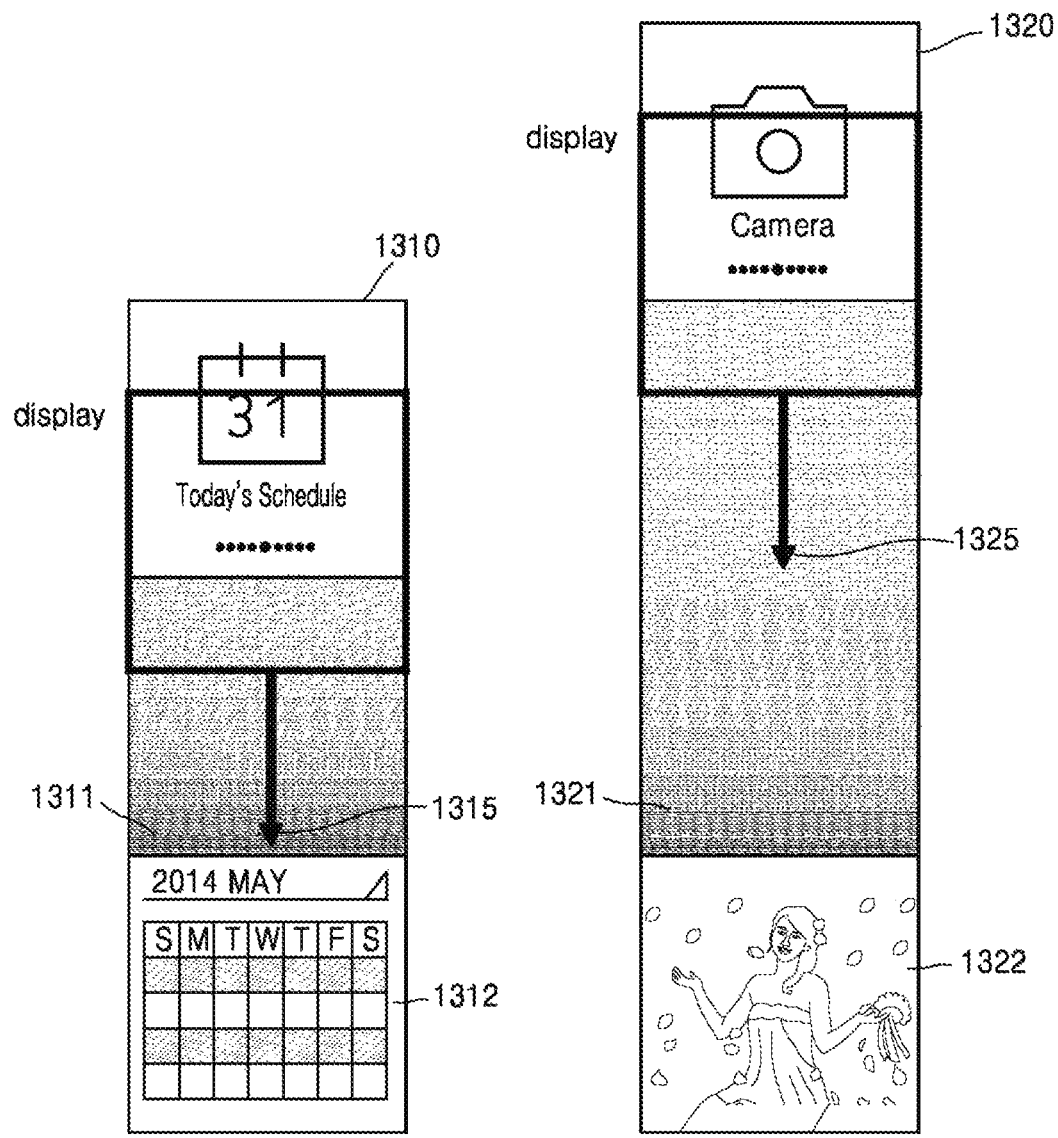
FIGS. 13A to 13C illustrate an example of adjusting a scroll speed of a predetermined image in a wearable device.
Figure 13C:
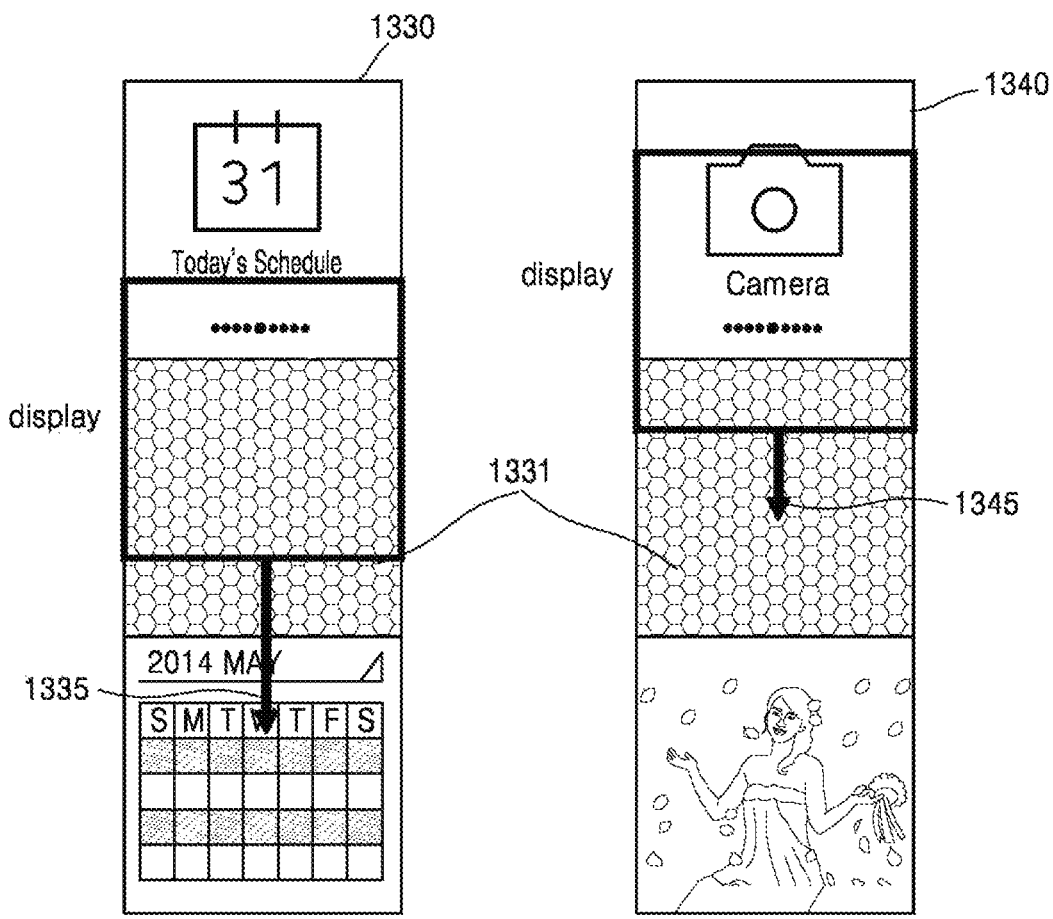

FIGS. 13A to 13C illustrate an example of adjusting a scroll speed of a predetermined image in the wearable device 100.

FIG. 13A illustrates a table of time information required until execution of an application in the wearable device 100.

Referring to the table of FIG. 13A, the wearable device 100 may acquire first required time information (e.g., 1 second) in response to an input for executing the schedule management application. In addition, the wearable device 100 may acquire second required time information (e.g., 2 seconds) in response to an input for executing the camera application.

FIG. 13B illustrates an example in which the wearable device 100 adjusts a length of a gradation image based on required time information of each application.

As shown in FIG. 13B, the wearable device 100 may generate a first gradation image 1311 based on the acquired first required time information (e.g., 1 second) and a scroll speed (e.g., a drag speed of the user or a preset scroll speed of 100 pixels/s). In this case, a length of the generated first gradation image 1311 may be 100 pixels.

Alternatively, the wearable device 100 may generate a second gradation image 1321 based on the acquired second required time information (e.g., 2 seconds) and the scroll speed (e.g., the drag speed of the user or the preset scroll speed of 100 pixels/s). In this case, a length of the generated second gradation image 1321 may be 200 pixels.

That is, if a scroll speed is constant as 100 pixels/s, the length of the generated second gradation image 1321 generated by the wearable device 100 may be double the length of the generated first gradation image 1311.

FIG. 13C illustrates an example in which the wearable device 100 adjusts a scroll speed of a user-designated image 1331 having a constant length based on required time information of each application.

Referring to FIG. 13C, the wearable device 100 may determine a first scroll speed 1335 based on the acquired first required time information (e.g., 1 second) and a length (e.g., 100 pixels) of the user-designated image 1331. In this case, the determined first scroll speed 1335 may be 100 pixels/s.

The wearable device 100 may determine a second scroll speed 1345 based on the acquired second required time information (e.g., 2 seconds) and the length (e.g., 100 pixels) of the user-designated image 1331. In this case, the determined second scroll speed 1345 may be 50 pixels/s.

If the length of the user-designated image 1331 is constant as 100 pixels, the determined first scroll speed 1335 (e.g., 100 pixels/s) may be double the determined second scroll speed 1345 (e.g., 50 pixels/s).

Figure 14:
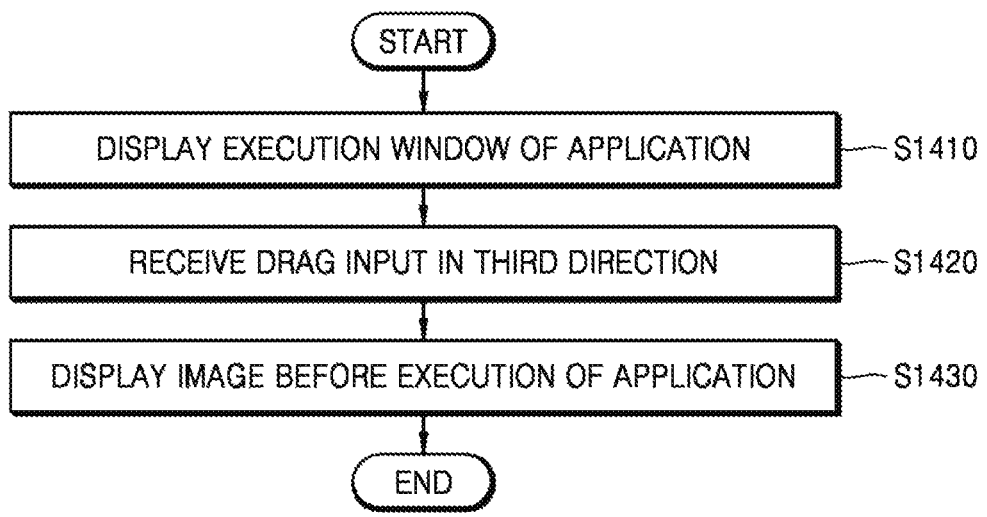
FIG. 14 is a flowchart illustrating an example method of terminating an application in a wearable device.

FIG. 14 is a flowchart illustrating an example method of terminating an application in the wearable device 100.

In operation S1410, the wearable device 100 may display an execution window of the application. The execution window of the application may indicate a window through which the wearable device 100 displays a main program of the application.

In operation S1420, the wearable device 100 may receive a drag input in a third direction that is different from the first direction.

The first direction may be a direction of sequentially scrolling identification information of the application, a gradation image, and the execution window of the application. However, the third direction may be a direction of sequentially scrolling the execution window of the application and the identification information of the application.

For example, if the first direction is a direction from the lower end of the screen to the upper end, the third direction may be a direction from the upper end of the screen to the lower end. Alternatively, if the first direction is a direction from the upper end of the screen to the lower end, the third direction may be a direction from the lower end of the screen to the upper end.

According to an example, the wearable device 100 may provide a consistent and intuitive user interface by executing the application in response to a drag input in the first direction (e.g., a direction from the lower end of the screen to the upper end) and terminating the application in response to a drag input in the third direction (e.g., a direction from the upper end of the screen to the lower end).

According to an example, the wearable device 100 may receive a motion input of lifting or moving, in the third direction, the screen on which the execution window of the application is displayed.

According to an example, the wearable device 100 may receive a bending input of bending, in the third direction, the screen on which the execution window of the application is displayed.

According to an example, the wearable device 100 may receive a key input on the screen on which the execution window of the application is displayed. Alternatively, the wearable device 100 may receive a voice input of commanding termination of the application.

In operation S1430, the wearable device 100 may display a pre-execution image of the application being executed in response to a drag input in the third direction.

According to an example, the wearable device 100 may display an application list including identification information of an application being executed, based on a drag input in the third direction.

According to an example, the wearable device 100 may display an image for confirming whether execution of an application is terminated, based on a drag input in the third direction.

According to an example, if an application (e.g., a browser application) includes a plurality of execution windows, the wearable device 100 may display a pre-execution window of the application based on a drag input in the third direction.

For example, if an application sequentially executes a first execution window and a second execution window, the wearable device 100 may display the first execution window based on a drag input in the third direction, which has been received on the second execution window.

According to an example, the wearable device 100 may sequentially display an execution window of an application being currently executed and a pre-execution window (or image) while scrolling the screen in the third direction.

For example, if an application sequentially executes a first execution window and a second execution window, the wearable device 100 may sequentially display the second execution window and the first execution window while scrolling the screen from the upper end to the lower end, based on a drag input in the third direction.

According to an example, the wearable device 100 may inform that the wearable device 100 normally performs each operation by scrolling an object (e.g., an execution window of an application) displayed on the screen during each operation in response to a user input for requesting for selection, execution, switch, or termination of the application.

Figure 15:
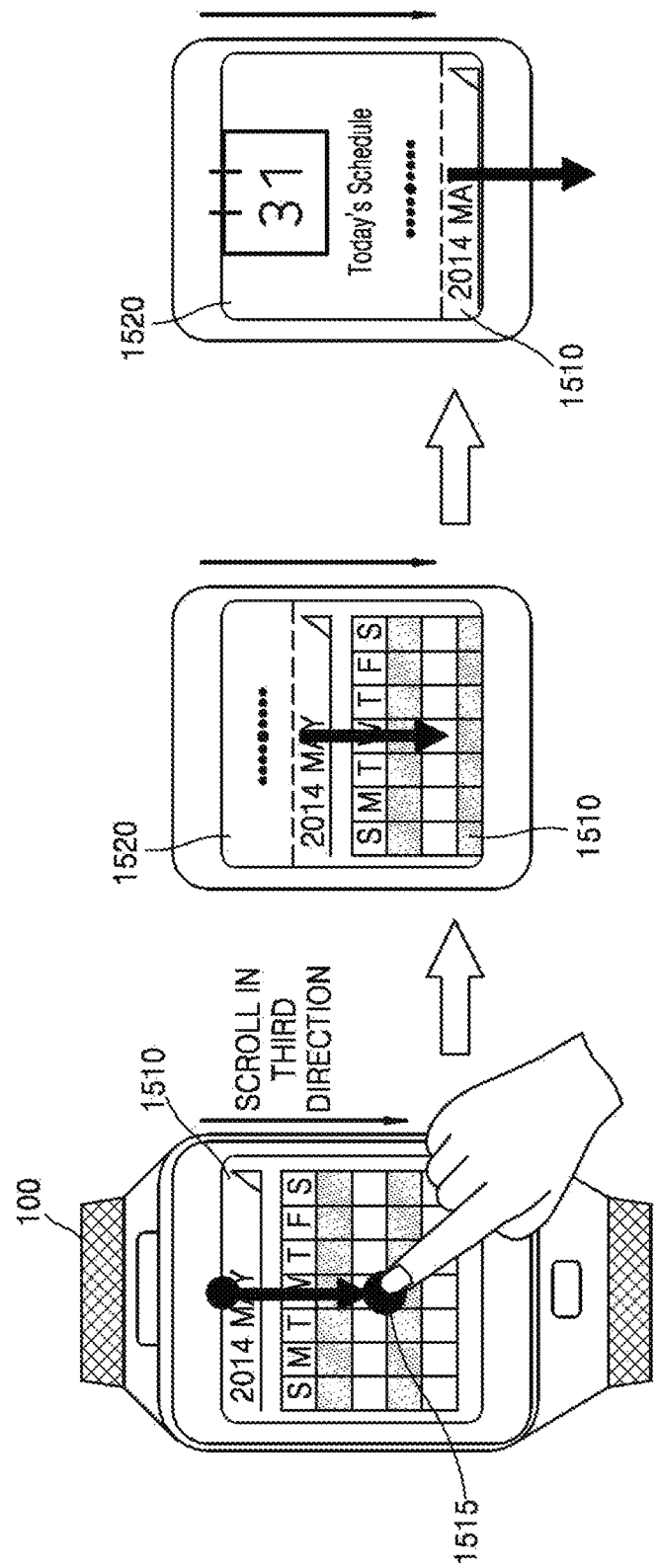
FIG. 15 illustrates an example in which a wearable device terminates an application.

FIG. 15 illustrates an example in which the wearable device 100 terminates an application.

Referring to FIG. 15, the wearable device 100 may execute the schedule management application and display an execution window 1510 of the schedule management application on the screen.

In this case, the wearable device 100 may receive a termination input 1515 of dragging the screen in the third direction (e.g., from the upper end of the screen to the lower end).

The wearable device 100 may display a screen image 1520 in which identification information (e.g., "Today's Schedule") of the schedule management application is displayed next to the execution window 1510 of the schedule management application by scrolling the screen in the third direction in response to the termination input 1515.

The wearable device 100 may perform a task required to terminate the schedule management application while sequentially scrolling and displaying the execution window 1510 of the schedule management application and screen image 1520 in which the identification information (e.g., "Today's Schedule") of the schedule management application is displayed.

Figure 16:
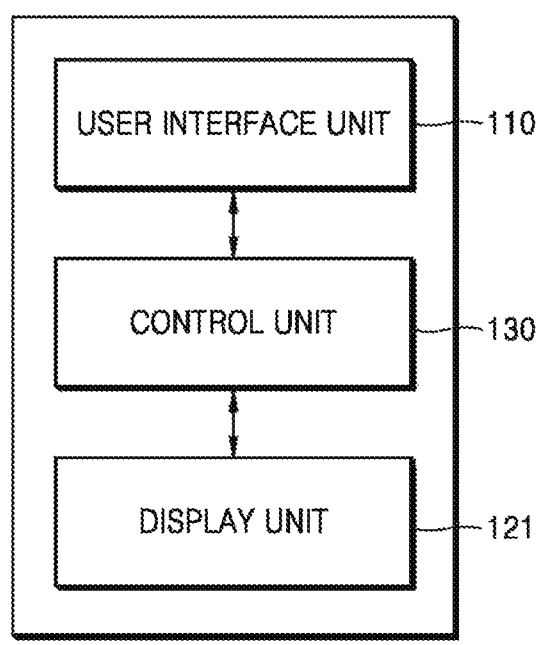
FIGS. 16 and 17 are block diagrams illustrating an example wearable device.
Figure 17:
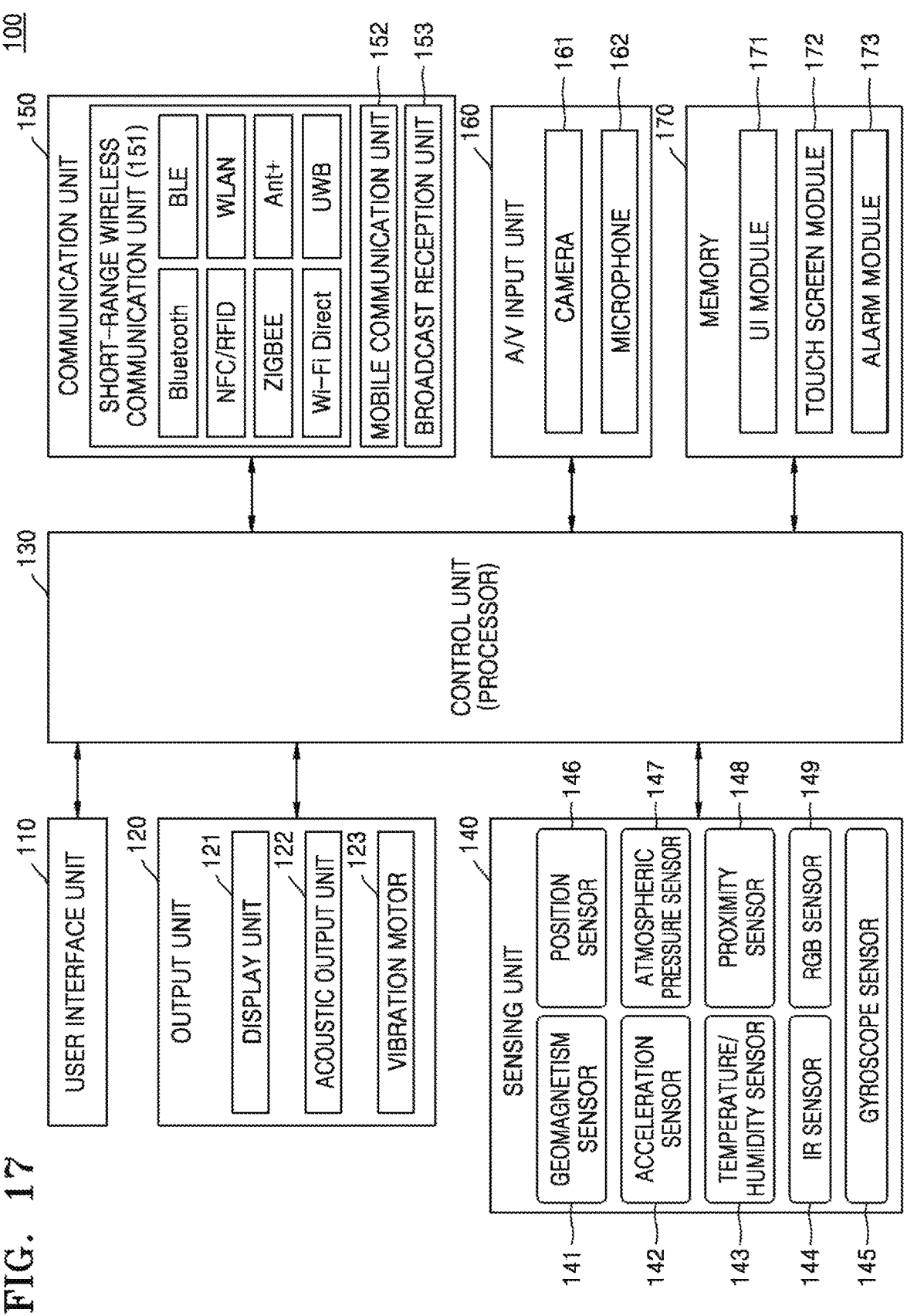

FIGS. 16 and 17 are block diagrams illustrating examples of the wearable device 100.

As shown in FIG. 16, the wearable device 100 according to an example may include interface circuitry in the form of a user interface unit 110, a controller or control unit 130, and a display unit 121 including a display. However, not all of the shown components are mandatory. The wearable device 100 may be implemented by more or less components than the shown components.

For example, as shown in FIG. 17, according to an example, the wearable device 100 may further include a communication unit 150 including communication circuitry, an output unit 120, a sensor or sensing unit 140, an audio/video (NV) input unit 160, and a memory 170 in addition to the user interface unit 110, the control unit 130, and the display unit 121.

The components described above will now be described.

The user interface unit 110 may indicate a means through which the user inputs data for controlling the wearable device 100. For example, the user interface unit 110 may include a keypad, a dome switch, a touch pad (a capacitive overlay touch pad, a resistive overlay touch pad, an infrared (IR) beam touch pad, a surface acoustic wave touch pad, an integral strain gauge touch pad, a piezoelectric touch pad, or the like), a jog wheel, a jog switch, and the like but is not limited thereto.

The user interface unit 110 may receive an execution input for requesting for execution of an application. The user interface unit 110 may receive a selection input of scrolling an application list provided by the wearable device 100.

The user interface unit 110 may receive a switch input for requesting for a switch between applications being executed. The user interface unit 110 may receive a termination input 10 for requesting for termination of an application being executed.

The display unit 121 may include a display for displaying identification information of an application, an application list including identification information of at least one application, an execution of an application, an editing window, or the like.

The display unit 121 may display information processed by the wearable device 100. For example, the display unit 121 may sequentially scroll and display a screen image including identification information of an application, which is generated by the wearable device 100, a predetermined image, and an execution screen image of the application.

The display unit 121 may scroll and display an application list including identification information of applications, which is generated by the wearable device 100.

The display unit 121 may sequentially scroll and display execution windows of applications being executed.

The display unit 121 may scroll and display identification information of an application next to an execution window of the application or scroll and display a window, which was displayed before the execution window of the application, next to the execution window of the application.

When the display unit 121 and a touch pad form a layer structure to configure a touch screen, the display unit 121 may be used as not only an output device but also an input device. The display unit 121 may include at least one of a liquid crystal display, a thin-film transistor liquid crystal display, an organic light-emitting diode, a flexible display, a three-dimensional (3D) display, and an electrophoretic display. The wearable device 100 may include two or more display units 121 according to an implementation form of the wearable device 100. The two or more display units 121 may be disposed to face each other by using a hinge.

An acoustic output unit 122 may output audio data received through the communication unit 150 or stored in the memory 170. In addition, the acoustic output unit 122 may output an acoustic signal related to a function (e.g., a call signal reception sound, a message reception sound, or an alarm sound) performed by the wearable device 100. The acoustic output unit 122 may include a speaker, a buzzer, and the like.

A vibration motor 123 may output a vibration signal. For example, the vibration motor 123 may output a vibration signal corresponding to an output of audio data or video data (e.g., a call signal reception sound, a message reception sound, or the like). In addition, the vibration motor 123 may output a vibration signal when a touch is inputted through the touch screen.

The controller or control unit 130 may be in the form of a processor and be configured to commonly control a general operation of the wearable device 100. For example, the control unit 130 may generally control the user interface unit 110, the output unit 120, the communication unit 150, the A/V input unit 160, and the like by executing programs stored in the memory 170.

The control unit 130 may be configured to acquire time information required until execution of an application in response to an input for requesting for the execution of the application. For example, the control unit 130 may be configured to acquire time information required until the execution of the application after receiving the input for requesting for the execution of the application, based on at least one of the performance and a load of the wearable device 100 and a load of the application.

The control unit 130 may be configured to provide an application list including identification information of at least one application. The control unit 130 may change an arrangement order of the identification information of the at least one application included in the application list, based on an input for changing an order of the application list.

The control unit 130 may be configured to recognize that an application corresponding to identification information of the application has been selected, based on the identification information of the application displayed by the display unit 121.

The control unit 130 may be configured to select a second application adjacent in the order to a first application and being executed from an application list, based on a switch input received by the user interface unit 110.

The control unit 130 may be configured to adjust a scroll speed of a predetermined image based on time information required until execution of an application after receiving an input for requesting for the execution of the application if a length of the predetermined image is pre-defined.

The control unit 130 may be configured to perform an operation required to execute an application in the middle of scrolling and displaying a predetermined image on the display unit 121 in response to an input for requesting for the execution of the application.

The control unit 130 may be configured to perform an operation required to terminate an application in the middle of sequentially scrolling and displaying an execution window and a pre-execution image of the application on the display unit 121 in response to an input for terminating execution of the application.

The sensing unit 140 may include any number of sensors, including at least one of a geomagnetism sensor 141, an acceleration sensor 142, a temperature/humidity sensor 143, an IR sensor 144, a gyroscope sensor 145, a position sensor 146, an atmospheric pressure sensor 147, a proximity sensor 148 and RGB sensor 149. A function of each sensor may be inferred by those of ordinary skill in the art from a name thereof, and thus a detailed description thereof is omitted herein.

The communication unit 150 may include one or more components enabling the wearable device 100 to communicate with an external device or a server. For example, the communication unit 150 may include a short-range wireless communication unit 151, a mobile communication unit 152, and a broadcast reception unit 153.

The short-range wireless communication unit 151 may include a Bluetooth communication unit, a Bluetooth low energy (BLE) communication unit, a near-field communication unit, a wireless local area network (WLAN) (Wi-Fi) communication unit, a Zigbee communication unit, an infrared data association (IrDA) communication unit, Wi-Fi Direct (WFD) communication unit, an ultra-wideband (UWB) communication unit, an Ant+ communication unit, and the like but is not limited thereto.

The mobile communication unit 152 may transmit and receive a wireless signal to and from at least one of a base station, an external terminal, and a server in a mobile communication network. The wireless signal may include a voice call signal, a video call signal, or various types of data according to text/multimedia message transmission and reception.

The broadcast reception unit 153 may receive a broadcast signal and/or broadcast related information from the outside through a broadcast channel, and the broadcast channel may include a satellite channel and a terrestrial channel. According to implemented examples, the wearable device 100 may not include the broadcast reception unit 153.

The communication unit 150 may receive a command for execution of an application from an external device connected to the wearable device 100. The communication unit 150 may receive a command for selection of an application from an external device connected to the wearable device 100. The communication unit 150 may receive a command for a switch between applications being executed from an external device connected to the wearable device 100. The communication unit 150 may receive a command for termination of an application from an external device connected to the wearable device 100.

The A/V input unit 160 is to input an audio signal or a video signal and may include a camera 161, a microphone 162, and the like. The camera 161 may receive an image frame of a still image, a moving picture, or the like through an image sensor in a video call mode or a capturing mode. An image captured through the image sensor may be processed by the control unit 130 or a separate image processing unit (not shown).

The image frame processed by the camera 161 may be stored in the memory 170 or transmitted to the outside through the communication unit 150. Two or more cameras 161 may be provided depending on an implementation form of the wearable device 100.

The microphone 162 may receive an external acoustic signal and process the external acoustic signal to electrical voice data. For example, the microphone 162 may receive an acoustic signal from an external device or a speaker. The microphone 162 may use various noise cancellation algorithms to cancel noise generated during a process of receiving an external acoustic signal.

The memory 170 may store programs for processing and control of the control unit 120 and store inputted/outputted data (e.g., a plurality of menus, a plurality of first-layer sub-menus corresponding to each of the plurality of menus, a plurality of second-layer sub-menus corresponding to each of the plurality of first-layer sub-menus, and the like).

The memory 170 may include at least one type of storage medium among a flash memory type memory, a hard disk type memory, a multimedia card micro type memory, a card type memory (e.g., a secure digital (SD) or extreme digital (XD) memory or the like), random access memory (RAM), static RAM (SRAM), read only memory (ROM), electrically erasable programmable ROM (EEPROM), PROM, a magnetic memory, a magnetic disc, and an optical disc. In addition, the wearable device 100 may operate a web storage or a cloud server which performs a storage function of the memory 170 over the Internet.

The programs stored in the memory 170 may be classified into a plurality of modules according to functions thereof, e.g., a user interface (UI) module 171, a touch screen module 172, an alarm module 173, and the like.

The UI module 171 may provide a specified UI, a graphic user interface (GUI), or the like interoperating with the wearable device 100 for each application. The touch screen module 172 may sense a touch gesture of the user on the touch screen and transmit information regarding the touch gesture to the control unit 130. According to an example, the touch screen module 172 may recognize and analyze a touch code. The touch screen module 172 may be configured by separate hardware including a controller.

Various sensors for sensing a touch or a proximity touch on the touch screen may be provided inside or nearby the touch screen. An example of a sensor for sensing a touch on the touch screen is a tactile sensor. The tactile sensor is a sensor for sensing a contact of a specific object at a degree of human feeling or more. The tactile sensor may sense various pieces of information such as roughness of a contact surface, hardness of a contact object, a temperature of a contact point, and the like.

Another example of a sensor for sensing a touch on the touch screen is the proximity sensor 148.

The proximity sensor 148 is a sensor for detecting whether an object approaching a predetermined detection surface or a nearby object exists by using an electromagnetic force or an IR ray without a mechanical contact. Examples of the proximity sensor 148 are a transmissive optoelectric sensor, a direct reflective optoelectric sensor, a mirror reflective optoelectric sensor, a high-frequency oscillation proximity sensor, a capacitive proximity sensor, a magnetic proximity sensor, an IR proximity sensor, and the like. Examples of a touch gesture of the user are a tap, a touch and hold, a double tap, a drag, a flick, a swipe, and the like.

The alarm module 173 may generate a signal for notifying of the occurrence of an event of the wearable device 100. Examples of an event generated by the wearable device 100 are call signal reception, message reception, a key signal input, a schedule notification, and the like. The alarm module 173 may output an alarm signal in a video signal form through the display unit 121, an alarm signal in an audio signal form through the acoustic output unit 122, or an alarm signal in a vibration signal form through the vibration motor 123.

The methods according to one or more examples of the disclosure may be implemented in a program instruction form executable through various computer means and recorded in a non-transitory computer-readable recording medium. The non-transitory computer-readable recording medium may include program instructions, data files, data structures, and the like, taken alone or in combination. The program instructions recorded in the medium may be particularly designed and configured for the one or more examples or well-known and usable to those of ordinary skill in the computer software field. Examples of the non-transitory computer-readable recording medium are magnetic media such as hard disks, floppy disks, and magnetic tapes, optical media such as CD-ROMs and digital versatile discs (DVDs), magneto-optical media such as floptical disks, and hardware devices, such as read-only memory (ROM), random-access memory (RAM), flash memories, and the like, particularly configured to store and execute program instructions. The program instructions include, for example, not only machine language codes made by a compiler but also high-language codes executable by a computer by using an interpreter or the like.

The wearable device 100 according to one or more examples of the disclosure may reduce a user's sensible waiting time of an application and provide a smooth application launching effect to the user by displaying an execution waiting screen image by taking into account time information required until execution of each application. In addition, the wearable device 100 according to one or more examples of the disclosure may inform that the wearable device 100 is normally operating by scrolling an object (e.g., an execution window of an application displayed on the screen during each operation in response to a user input for requesting for selection, execution, switch, or termination of the application. In addition, the wearable device 100 according to one or more examples of the disclosure may provide a consistent and intuitive user interface.

It should be understood that examples described herein should be considered in a descriptive sense only and not for purposes of limitation. Descriptions of features or aspects within each example should typically be considered as available for other similar features or aspects in other examples.

While one or more examples have been described with reference to the figures, it will be understood by those of ordinary skill in the art that various changes in form and details may be made therein without departing from the spirit and scope as defined by the following claims.

What is claimed is:

1. A method of executing an application in a wearable device, comprising:
   receiving a user input requesting execution of a first application;
   determining a time duration, which is a time length from a time point of receiving the user input to a time point of a completion of launching the first application in response to the user input; and
   automatically scrolling and displaying, without user intervention, a predetermined image in a first direction during the time duration,
   wherein automatically scrolling and displaying the predetermined image in the first direction comprises automatically adjusting a scroll speed in the first direction based on the time duration when a length of the predetermined images is pre-defined.

2. The method of claim 1, wherein the user input requesting execution of the first application includes a drag input in the first direction.

3. The method of claim 2, further comprising:
   providing an application list including identification information of at least one application; and
   selecting the first application from the application list based on a drag input in a second direction, the second direction being different from the first direction.

4. The method of claim 3, further comprising:
   receiving an application switch input while displaying an execution window of the first application;
   selecting a second application adjacent to the identification information of the first application and being executed from the application list based on the application switch input; and
   displaying an execution window of the second application.

5. The method of claim 3, wherein providing the application list comprises changing an arrangement order of the identification information of the at least one application included in the application list based on a received input.

6. The method of claim 1, further comprising displaying an execution window of the first application next to the predetermined image based on the time duration.

7. The method of claim 6, further comprising:
   receiving a drag input in a second direction that is different from the first direction while displaying the execution window of the first application; and
   displaying a previous image displayed before the completion of launching the first application based on the drag input in the second direction.

8. The method of claim 1, wherein determining of the time duration comprises acquiring the time duration based on at least one of the performance of the wearable device, a load of the wearable device, and a load of the first application.

9. A non-transitory computer-readable medium having recorded thereon a computer-readable program which, when executed by a computer, causes the computer to perform:
   receiving a user input requesting execution of a first application;
   determining a time duration, which is a time length from a time point of receiving the user input to a time point of a completion of launching the first application in response to the user input; and
   automatically scrolling and displaying, without a user intervention, a predetermined image in a first direction during the time duration,
   wherein automatically scrolling and displaying the predetermined image in the first direction comprises automatically adjusting a scroll speed in the first direction based on the time duration when a length of the predetermined image is pre-defined.

10. A wearable device comprising:
    an interface configured to receive a user input requesting execution of a first application;
    a controller configured to determine a time duration, which is a time length from a time point of receiving the user input to a time point of a completion of launching the first application in response to the user input; and
    a display configured to automatically scroll and display, without a user intervention, a predetermined image in a first direction during the time duration,
    wherein automatically scrolling and displaying the predetermined image in the first direction comprises automatically adjusting a scroll speed in the first direction based on the time duration when a length of the predetermined image is pre-defined.

11. The wearable device of claim 10, wherein the user input requesting execution of the first application includes a drag input in the first direction.

12. The wearable device of claim 11, wherein the interface is configured to receive a drag input in a second direction, the second direction being different from the first direction,
the controller is configured to provide an application list including identification information of at least one application and to select the first application from the application list based on the drag input in the second direction, and
the display is configured to display identification information of the first application.

13. The wearable device of claim 12, wherein the interface is configured to receive an application switch input while the device is displaying an execution window of the first application,
the controller is configured to select a second application adjacent to the identification information of the first application and being executed from the application list based on the application switch input, and
the display is configured to display an execution window of the second application.

14. The wearable device of claim 12, wherein the controller is configured to change an arrangement order of the identification information of the at least one application included in the application list based on a received input.

15. The wearable device of claim 10, wherein the display is configured to display an execution window of the first application next to the predetermined image based on the time duration.

16. The wearable device of claim 15, wherein the interface is configured to receive a drag input in a second direction, the second direction being different from the first direction while the display displays the execution window of the first application, and
the display is configured to display a previous image displayed before the completion of launching of the first application based on the drag input in the second direction.

17. The wearable device of claim 10, wherein the controller is configured to determine the time duration based on at least one of the performance of the wearable device, a load of the wearable device, and a load of the first application.

* * * * *